US012669190B2

(12) United States Patent (10) Patent No.: US 12,669,190 B2

Bertolotti (45) Date of Patent: Jun. 30, 2026

(54) CARTRIDGE FOR DYNAMIC REDUCTION OF A PRESSURE OF A FLUID AND RELATED DEVICE FOR TREATING A FLUID

(71) Applicant: I.V.A.R. S.P.A., Prevalle (IT)

(72) Inventor: Umberto Bertolotti, Prevalle (IT)

(73) Assignee: I.V.A.R. S.P.A., Prevalle (IT)

( * ) Notice: Subject to any disclaimer, the term of this patent is extended or adjusted under 35 U.S.C. 154(b) by 0 days.

(21) Appl. No.: 18/839,295

(22) PCT Filed: Jan. 13, 2023

(86) PCT No.: PCT/IB2023/050327

§ 371 (c)(1),
(2) Date: Aug. 16, 2024

(87) PCT Pub. No.: WO2023/156856

PCT Pub. Date: Aug. 24, 2023

(65) Prior Publication Data

US 2025/0155039 A1 May 15, 2025

(30) Foreign Application Priority Data

Feb. 17, 2022 (IT) ........................ 102022000002963

(51) Int. Cl.
*F16K 17/04* (2006.01)
*F24D 19/10* (2006.01)
(Continued)

(52) U.S. Cl.
CPC ...... *F16K 17/0493* (2013.01); *F24D 19/1015* (2013.01); *F24D 19/1036* (2013.01);
(Continued)

(58) Field of Classification Search
CPC .............. Y10T 137/7791; G05D 7/014; G05D 23/023; F16K 17/046; F16K 17/048;
(Continued)

(56) References Cited

U.S. PATENT DOCUMENTS 1,029,464 A * 6/1912 Ruwell ............... F16K 17/0433
137/514.7
2,777,465 A * 1/1957 Adams ...................... F16K 3/30
137/514.7
(Continued)

FOREIGN PATENT DOCUMENTS

WO 9609484 A1 3/1996
WO 2014044282 A2 3/2014

OTHER PUBLICATIONS

International Search Report and Written Opinion dated Apr. 11, 2023 in corresponding International Application No. PCT/IB2023/050327, 11 pages.

*Primary Examiner* — William M Mccalister
(74) *Attorney, Agent, or Firm* — MH2 TECHNOLOGY LAW GROUP LLP

(57) ABSTRACT

A cartridge for dynamic reduction of a pressure of a fluid entering a valve body includes a main body having a first inlet interface for receiving the fluid at a first pressure, a second outlet interface for sending to the valve body the fluid at a second pressure, a third control interface for receiving the liquid at a third outlet pressure from the valve body, a passage adapted to place in fluid communication the first interface and the second interface developing along a first direction, and an internal chamber traversed by the passage and developing in the main body along a second direction not parallel to the first direction. The valve body includes a shutter movably housed along the second direction in the internal chamber and separating the third interface from the passage. The shutter is active on the passage (Continued)

in order to obstruct it at least partially in a selective and variable manner at least between a minimum interference position and a maximum interference position with the passage. The position of the shutter is determined by the first inlet pressure and the third outlet pressure.

19 Claims, 12 Drawing Sheets

(51) Int. Cl.
  *G05D 7/01* (2006.01)
  *G05D 23/02* (2006.01)
(52) U.S. Cl.
  CPC ............. *G05D 7/01* (2013.01); *G05D 7/0126* (2013.01); *G05D 23/023* (2013.01); *F24D 2220/0257* (2013.01)
(58) Field of Classification Search
  CPC . F16K 3/26; F16K 3/262; F16K 3/267; F16K 17/0126; F24D 19/1015; F24D 19/1036; F24D 2220/0257
  See application file for complete search history.

(56) References Cited

U.S. PATENT DOCUMENTS

| | | | | |
|---|---|---|---|---|
| 3,004,551 | A * | 10/1961 | Shafer | F16K 3/26 137/246.22 |
| 3,532,122 | A * | 10/1970 | Bienzeisler | F15B 13/04 137/625.37 |
| 3,682,200 | A * | 8/1972 | Deve | F16K 3/262 251/309 |
| 4,145,025 | A * | 3/1979 | Bergeron | F16K 17/10 251/63 |
| 4,267,861 | A * | 5/1981 | Roth | F16K 11/065 251/324 |
| 4,535,969 | A * | 8/1985 | Riley | F16K 5/04 251/215 |
| 4,694,730 | A * | 9/1987 | Krieger | E21D 23/26 251/63 |
| 4,791,956 | A * | 12/1988 | Kominami | G05D 7/0126 137/503 |
| 4,842,019 | A * | 6/1989 | Rousset | F15B 13/0417 91/446 |
| 4,889,159 | A * | 12/1989 | Feild | F16K 1/00 137/489 |
| 5,168,895 | A * | 12/1992 | Voss | F16K 17/046 137/538 |
| 5,875,806 | A * | 3/1999 | Maynard | G05D 7/0133 137/8 |
| 5,931,187 | A * | 8/1999 | Williams | F16K 31/1266 251/297 |
| 6,026,849 | A * | 2/2000 | Thordarson | G05D 16/0672 137/613 |
| 8,336,575 | B2 * | 12/2012 | Guion | G05D 16/10 137/505.11 |
| 8,469,053 | B2 * | 6/2013 | Kirchner | F16K 47/04 251/327 |
| 9,611,941 | B1 * | 4/2017 | DeFelice | F16K 1/34 |
| 10,883,644 | B2 * | 1/2021 | Jepp | F24D 19/088 |
| 2009/0314359 | A1 * | 12/2009 | Woelfges | G05D 16/166 137/488 |
| 2015/0308222 | A1 * | 10/2015 | Hall | E21B 34/04 137/538 |
| 2021/0140551 | A1 * | 5/2021 | Terhune | F16K 17/10 |

* cited by examiner

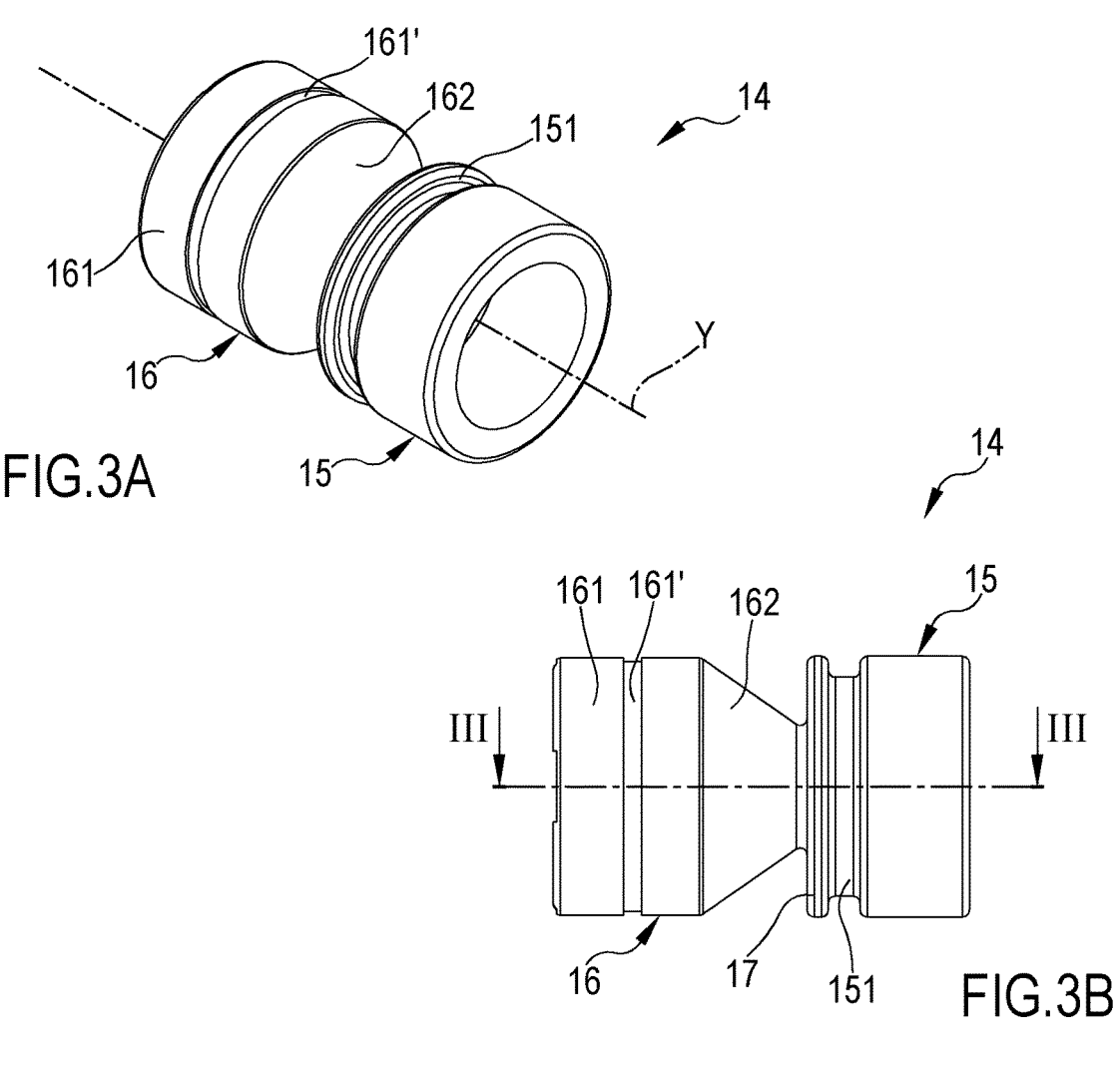
FIG.3A
FIG.3B
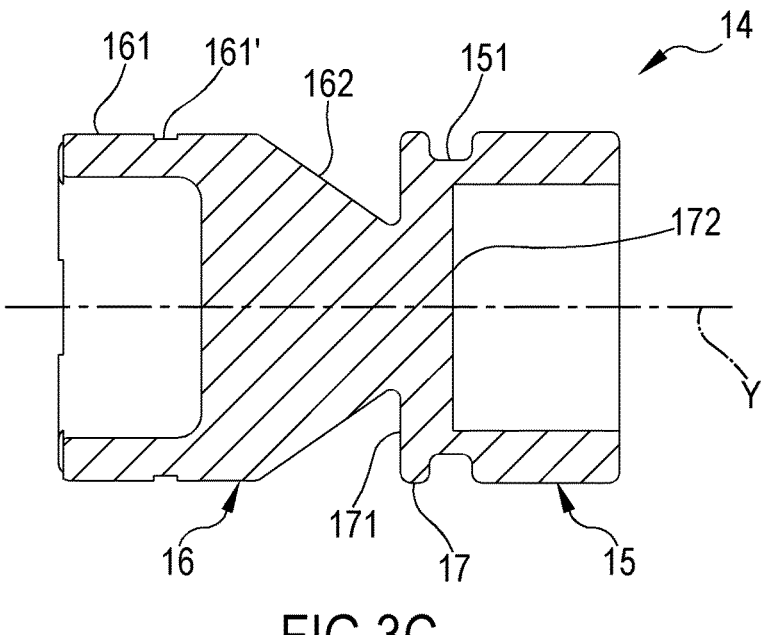
FIG.3C

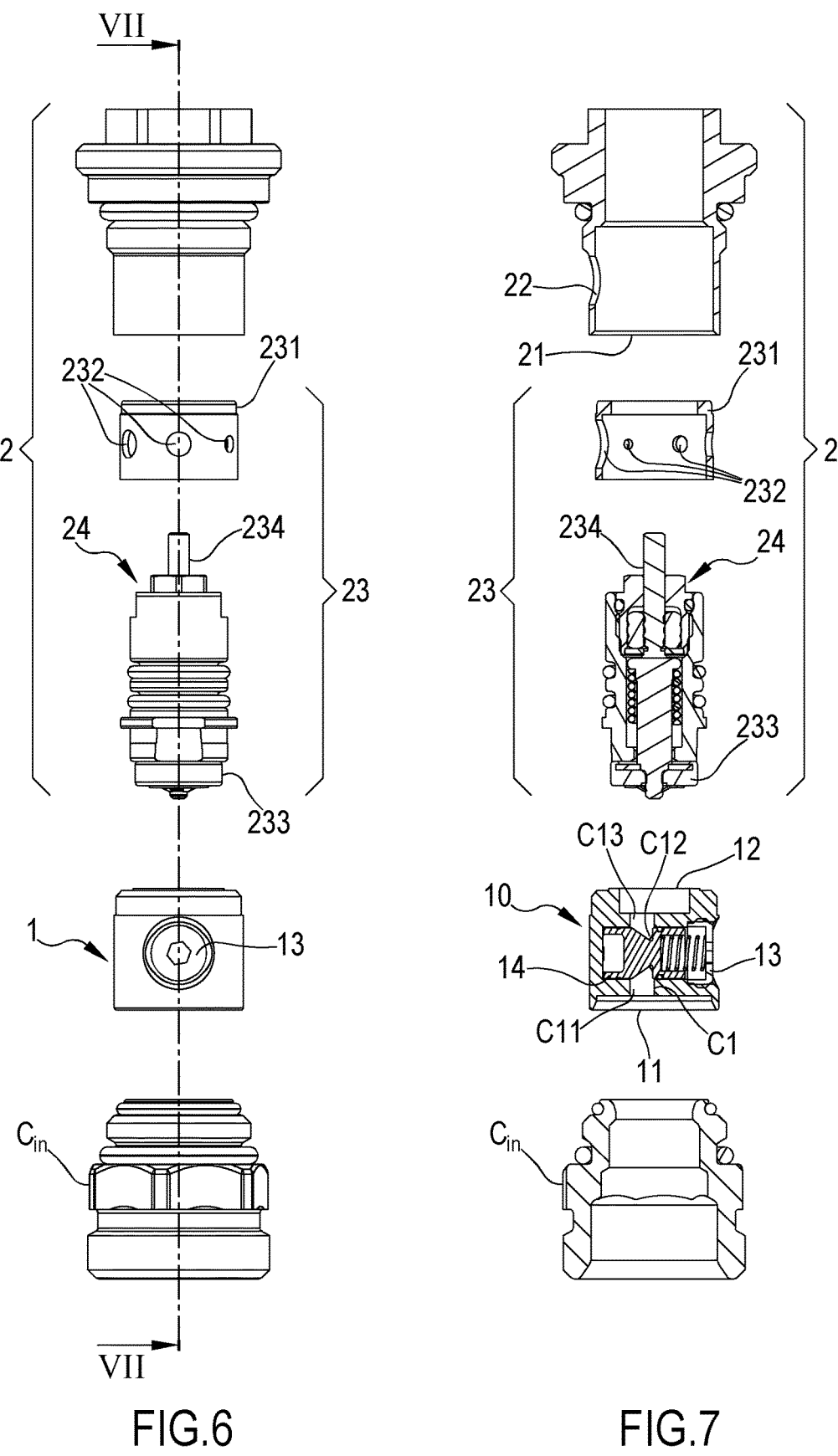
FIG.6                    FIG.7

FIG.14
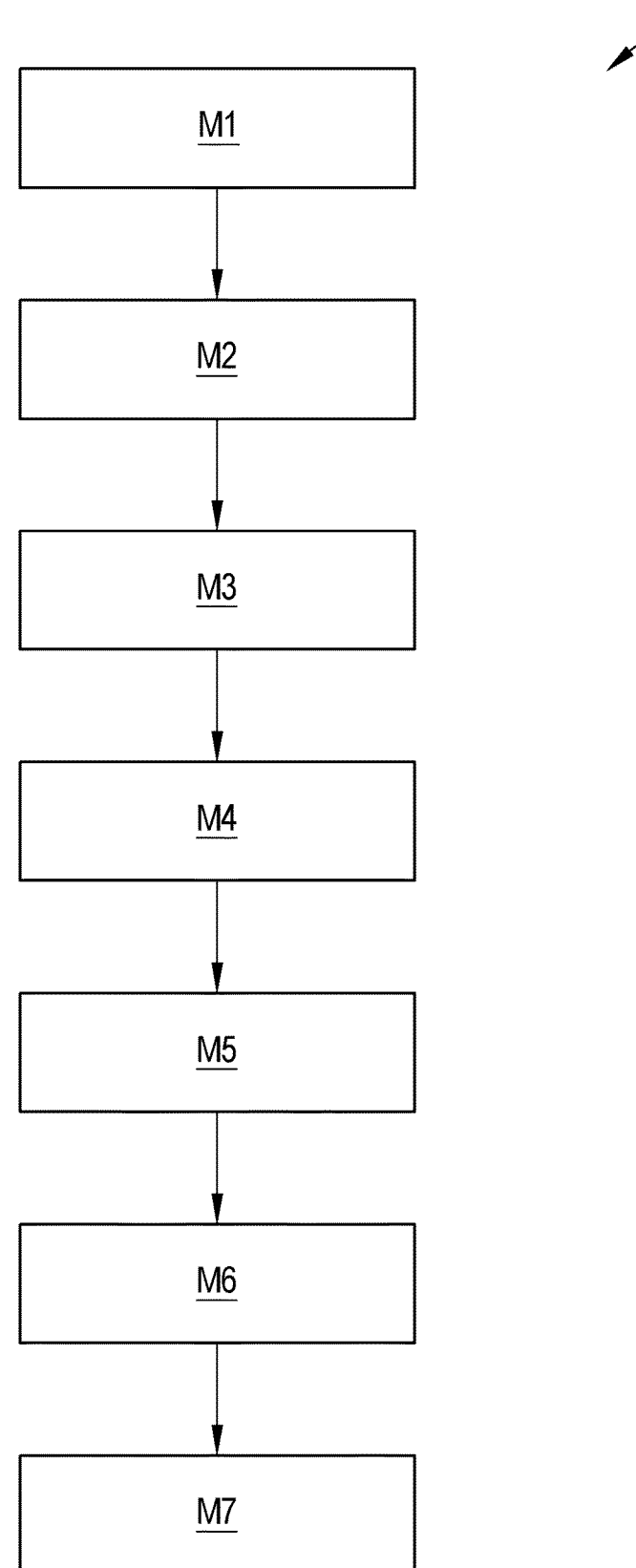

CARTRIDGE FOR DYNAMIC REDUCTION OF A PRESSURE OF A FLUID AND RELATED DEVICE FOR TREATING A FLUID

CROSS-REFERENCE TO RELATED APPLICATIONS

This application is a U.S. National Stage application of PCT/IB2023/050327, filed Jan. 13, 2023, pending, which claims priority to Italian Patent Application No. 102022000002963, filed Feb. 17, 2022, the disclosures of which are hereby incorporated by reference in their entireties.

FIELD OF THE INVENTION

The present invention has as its object a cartridge for dynamic reduction of a pressure of a fluid, specifically of a liquid. The present invention can find application in domestic and/or industrial hydraulic plants, for example in heating plants or water and sanitary installations. In particular, the present cartridge can be used upwards of a valve body, for example within the context of a flow adjustment device a fluid within a heating hydraulic plant or a water and sanitary installation. The present invention is furthermore directed to a device for treating a fluid comprising said cartridge for dynamic adjustment of the pressure and to a mounting method of said device for treating a fluid.

BACKGROUND ART

As it is known, the hydraulic systems are generally provided with devices for treating a fluid in order to avoid situations that could bring to malfunctioning or failures of the plant itself. A classic example of these devices for treating a fluid is given by flow adjustment devices of circulating fluid in order to avoid insufficient or excessive flow rates.

In particular, within the context of heating plants, it is known the use of thermostatic valves in order to adjust the flow, and thus the flow rate, of the liquid circulating within the relative plant comprising radiant elements for heating a room. These radiating elements may be both external radiators, also called radiators, and internal radiators, as in the case of coils installed under the floor of a room in underfloor heating plants.

If the flow rate within the heating system is insufficient or excessive, it would not be possible to maintain the room at the desired temperature. To this end, heating systems are typically equipped with thermostatic valves to control the flow, at settable values, so as to ensure that the room has a temperature that is as constant as possible. These thermostatic valves are typically manually adjustable at the relative adjustment devices. Specifically, these thermostatic valves are equipped with shutters that are capable of at least partially occluding an internal passage so as to adjust the fluid flow within the hydraulic plant wherein they are installed. In principle, the more the shutter occludes the passage, the lower is the fluid flow, and vice versa, the more the shutter frees the passage, the higher is the fluid flow. The adjustment of the position of the shutter is carried out at the relative adjustment element.

In the most advanced heating systems, thermostatic heads are generally installed in combination with these thermostatic valves. These thermostatic heads are equipped with temperature sensing devices (sensors) and means of actuating the shutter in order to allow a finer adjustment of the shutter position. Thus, the thermostatic head controls the movement of the shutter of the thermostatic valve according to the detected temperature. Specifically, the shutter is moved for further occluding the affected passage when the detected temperature is higher than the set value such as to diminish the flow inside the system and reduce the heating of the room.

Vice versa, the thermostatic head controls the movement of the shutter for further opening the passage when the detected temperature is lower than the set value. In this way, temperature fluctuations of the room, wherein the radiant elements are arranged, are reduced and is ensured a higher thermal comfort, rather than significant savings from an energetic point of view.

In other words, in heating plants the adjustment of flow rate occurs in two steps: a first step of raw adjustment, wherein a value of nominal flow rate is set through appropriate adjustment elements suitable for setting the starting position of the shutter, and a second fine adjustment step wherein the thermostatic head adjusts the position of the shutter according to the temperature actually detected.

However, today's domestic and/or water and sanitary hydraulic plants typically comprise several fields to be jointly supplied and controlled. The opening, the closing or the flow adjustment of the fluid in one of said fields causes pressure variations to which other fields are subjected, with consequent changes also of the fluid flow in said fields. These pressure variations make the flow adjustment complicated from valve bodies in charge for maintaining a flow rate as much as possible constant. For example, high inlet pressures at valve bodies generate outlet flow rates that take on values higher than the desired value and that should be ensured by the valve body in optimal working conditions. As previously specified, the impossibility to keep the flow rate constant has an impact both on terms of energy saving and of thermal comfort.

Furthermore, another drawback connected to too high inlet pressure values refers to the possible exposure of valve components to the risk of malfunctioning or, in extreme cases, of breaks. In fact, excessive inlet pressures at the thermostatic valves can compromise the functioning thereof.

Another drawback connected to excessive pressure values refers to the creation of an annoying noisy auditory component due to the passage of fluid at high pressure inside the valve bodies.

In order to overcome these drawbacks, some modern hydraulic plants are equipped with pressure reducers upwards of valve bodies, in particular of thermostatic values, in order to reduce the inlet pressure and make the pressure management easier, further than avoid malfunctioning, breaks and said annoying noise generated by too high pressure values.

In this context, however, the use of passive and static pressure reducers is of little use because these devices reduce the pressure also in conditions wherein the valve body works effectively, leading to counterproductive results.

In this sense, during the years solutions have been developed that implement dynamic pressure reducers upwards of flow adjustment valve body (thermostatic valve) in order to stabilize the inlet pressure at the valve body itself. In other terms, said dynamic pressure reducers are configured for ensuring that the inlet pressure at the body valve allows an efficient functioning thereof and therefore for avoiding the above-mentioned drawbacks caused by an excessive pressure on the delivery duct at the valve body.

A valve device implementing this type of technical solution in an exemplary manner is offered by the document EP3513266A1. This document shows a flowrate stabilising monoblock cartridge for a hydraulic valve wherein a dynamic mechanism of pressure reduction is positioned at the inlet duct in order to damp the pressure received in an adaptive manner. In its essential components the device of EP3513266A1 is composed of a thermostatic valve, possibly combinable with a thermostatic head, and of a mechanism of pressure reduction positioned upwards of the thermostatic valve. This reduction mechanism of inlet pressure takes on the shape of a deformable passage arranged axially with respect to the inlet direction of the fluid and the section thereof is varied by means of a diaphragm subjected to a pressure differential. The entering liquid, passing through the deformable passage of the reduction mechanism of pressure, undergoes a lowering of pressure proportional to the section of the passage itself, which as said is controlled by the movement of the diaphragm. As mentioned above, the position assumed by the diaphragm, and thus the section of the deformable passage, depends on the pressure difference to which the two faces of the diaphragm itself are subjected. On one hand, the diaphragm faces a chamber downwards of the pressure reduction mechanism and thus containing liquid at the pressure reduced by the deformable passage. On the other hand, the diaphragm faces a chamber in fluid communication with the duct downwards of the thermostatic valve and thus containing liquid at the pressure exiting the entire cartridge. In this way, it is ensured that the thermostatic valve operates at a pressure differential adapted to allow it to function effectively. When the inlet pressure at the thermostatic valve decreases too much relative to the outlet pressure at the cartridge, the diaphragm moves accordingly to increase the section of the deformable passage in order to dampen the pressure-reducing effect and increase the inlet pressure at the thermostatic valve itself. On the contrary, when the inlet pressure at the thermostatic valve increases too much relative to the outlet pressure at the cartridge, the diaphragm adapts to narrow the section of the deformable passage so as to increase the pressure-reducing effect and decrease the inlet pressure at the thermostatic valve itself. In this way, the thermostatic valve is working under almost constant pressure difference conditions and, at the same time, the annoying background noise characteristic of thermostatic valves when the inlet liquid is too pressurised is avoided.

In the art, there are other solutions based on principles similar to the one of the document EP3513266A1, i.e. on the presence of a dynamic mechanism for reducing the inlet pressure at the thermostatic valve the configuration thereof, and thus action, is determined by the pressure difference downwards and upwards of the thermostatic valve itself.

Still other solutions are based on dynamic pressure reduction mechanisms whose damping effect adjustment is determined by the pressure difference upwards and downwards of the reduction mechanism itself, i.e. on the difference between the inlet pressure and the outlet pressure of the reduction mechanism itself.

Other solutions provide for the use of pressure reduction mechanisms controlled solely by the pressure downwards of the thermostatic valve or upwards of the pressure reduction mechanism.

Independently of the operating principle, known solutions involve several drawbacks that discourage their use. First of all, as previously mentioned, known solutions apply reduction factors of the inlet pressure by adapting their functioning only according to the pressure or pressure differential to which a portion of the entire system composed of the reduction mechanism and the valve is subjected. For example, the mechanism of EP3513266A1 adapts to the pressure differential to which only the valve is subjected. As mentioned, other mechanisms are self-adjusting according to the pressure differential at the ends of the reduction mechanism itself or even according to only the inlet pressure at the whole plant or the outlet pressure at the valve body.

The adjustment of the inlet pressure at the valve body is based on the analysis of a portion of the whole plant and therefore sub-optimal.

Furthermore, the above-mentioned known solutions are characterized by particularly sophisticated mechanisms and by the significant construction complexity. Considering the device of document EP3513266A1 it is possible to observe how the assembly formed by the deformable passage and by the diaphragm is particularly sophisticated and with a significant structural complexity. The presence of these elements makes the cartridge for dynamic adjustment of the flow particularly complex both from the design point of view and from the installation point of view.

Furthermore, the high structural complexity of devices with known mechanisms for dynamic reduction of the pressure makes them particularly anti-economical and, therefore, difficult to adopt on a large scale.

Furthermore, the presence of so complex systems makes the whole system more prone to malfunctioning and breaks. In fact, it is known the quick decay of the performance of a diaphragm or other elastically deformable components. This drawback significantly reduces the life cycle of the whole plant, which, after a short period of time, could experience an undesirable decrease in performance and/or require numerous and complex maintenance operations.

PURPOSE OF THE INVENTION

A purpose of the present invention is therefore to solve at least one of the drawbacks and/or limits of the previous solutions.

A first purpose of the invention is to make available a cartridge for dynamic reduction of the inlet pressure at a valve body that is particularly efficient and precise in reducing an excessive inlet pressure at the cartridge itself. It is then purpose of the present invention to show a cartridge for dynamic reduction of the inlet pressure at a valve body that allows the valve body itself to operate in optimal and safe conditions.

Purpose of the present invention is also to provide for a cartridge for dynamic reduction of the pressure that adapts to the pressure conditions wherein operates the whole system composed of the cartridge and the valve body.

Another purpose of the present invention is to describe a cartridge for dynamic reduction of the pressure with a rational structure, easy to produce and with a particularly easy functioning. Consequently, another purpose of the present invention is to make available a cartridge for dynamic reduction of the pressure strong and less prone to malfunctioning and/or breaks.

It is then purpose of the present invention to show a device for treating a fluid with a particularly efficient and reliable functioning according to the constructive simplicity of its components.

Another purpose of the present invention is to propose a device for treating a fluid that is, in use, particularly quiet.

Another purpose of the present invention is also to make available a mounting method of a device for treating a fluid with a particularly easy actuation and that allows to provide for an efficient and strong device.

Another purpose of the present invention is to create alternative solutions, with respect to the known technique, which are characterized by a partial efficiency, a high structural and constructive complexity and a modest strength.

These purposes, and other eventual ones, that will better result during the present description, are substantially reached by a cartridge for dynamic reduction of the inlet pressure at a valve body, a device for treating a fluid and a mounting method of said device for treating according to one or more of the attached claims, each one taken on its own (without the relative dependencies) or in any combination with other claims, as well as according to the following aspects and/or embodiments, variously combined, also with the above-mentioned claims.

Aspects of the invention are listed below.

SUMMARY

According to a first aspect, the present disclosure refers to a cartridge for dynamic reduction of the pressure of a fluid intended for a valve body. In particular, the present disclosure refers to a cartridge for the reduction of the pressure of a fluid intended for undergoing a treatment by a valve body.

As it will be clearer hereinafter, said cartridge is configured for receiving an inlet fluid and reducing the pressure thereof according to a comparison between the pressure of the fluid entering the cartridge itself and the pressure of the fluid downwards of the valve body to which the cartridge is associated.

It has to be noted as of now that in the present document, notwithstanding their gender-species relationship, the terms "fluid" and "liquid" will be used interchangeably given the application of the invention to the field of hydraulic plants. In this sense, in the context of the present invention, the terms "fluid" and "liquid" can be considered synonymous.

Furthermore, in the present document with the term "valve body" is intended any fluid treatment organ, for example in charge of opening/closing a passage or adjusting the flow—also called flow rate—or pressure of the circulating fluid.

According to an aspect, the pressure reduction cartridge comprises a main body. Said main body constitutes the external bearing structure—or case—of the reduction cartridge and allows the housing of other components of the cartridge that will be described below in the present document.

According to an aspect, the main body comprises a first inlet interface. Said first inlet interface is configured for receiving the fluid at a first inlet pressure. According to this aspect, the first interface appears as an opening, having variable depth according to the applications, obtained in said main body through which the inlet fluid is received to undergo a reduction treatment of the pressure.

According to a non-limiting aspect, said first interface is connectable to an inlet duct through which the fluid at the first pressure flows for entering the main body of the cartridge and for being then subjected to a reduction treatment of the pressure that will be hereinafter described.

According to another non-limiting aspect, said first interface comprises first connection means for allowing the connection, for example, to said inlet duct. According to an embodiment, said first connection means are threaded means. According to another embodiment, said first connection means are connection means by interference. According to another non-limiting aspect, said first connection means comprise a housing seat for a seal gasket, for example an O-ring, in order to minimize the risk of fluid leaking between the cartridge and the inlet duct. It should be noted that other embodiments equivalent to those mentioned above can be taken on by the first connection means without this significantly affecting the shape of the cartridge and the purpose of the present disclosure.

According to another aspect, the main body comprises a second outlet interface. Said second outlet interface is configured for sending to said valve body the fluid at a second intermediate pressure. According to this aspect, the second interface appears as an opening, having variable depth according to the applications, obtained in said main body and through which the fluid subjected to the reduction treatment of the pressure, i.e. the fluid at the second intermediate pressure, exits the cartridge and is sent to the valve body.

According to an aspect, said second pressure is lower than or equal to said first pressure. In fact, as mentioned, the present invention refers to a cartridge for dynamic reduction of the inlet pressure at valve body. Being the pressure of the fluid sent to the valve body equal to the second pressure, it is implicit that the value of the second pressure cannot exceed the value of the first inlet pressure at the cartridge itself.

According to a non-limiting aspect, said second interface is connectible, directly or indirectly through an intermediate duct, to the valve body to which the fluid at the second intermediate pressure is sent for another treatment that will be hereinafter described. It should be noted that the cartridge according to the present disclosure can be installed in direct contact with the valve body, i.e. without the interposition of other elements, or in indirect contact with the valve body itself, i.e. through the interposition of third means such as ducts or joints, without this involving significant changes in the behaviour of the whole cartridge-valve body system. According to another non-limiting aspect, said second interface comprises second connection means to said valve body or to said intermediate duct. According to an embodiment, said second connection means are threaded means. According to another embodiment, said second connection means are connection means by interference. According to another non-limiting aspect, said second connection means comprise a housing seat for a seal gasket, for example an O-ring, in order to minimize the risk of fluid leaking between the cartridge and the valve body, or equivalently, between the cartridge and the intermediate duct. It should be noted that other embodiments equivalent to those mentioned above can be taken on by the second connection means without this significantly affecting the shape of the cartridge and the object of the present disclosure.

According to another aspect, the main body comprises a third control interface. Said third control interface is configured for receiving the fluid at a third outlet pressure from the valve body. According to this aspect, the third interface appears as an opening, having variable depth according to the applications, obtained in said main body and through which it is received the fluid exiting from the valve body at the third pressure, i.e. the fluid that has been subjected both to the reduction treatment of the pressure by the cartridge and to the treatment to which the valve body is designated.

According to a non-limiting aspect, said third interface is connectible to a duct through which the fluid exiting from the valve body reaches again the cartridge for influencing the dynamic behaviour thereof, as it will be described hereinafter with more details.

It should be noted that, considering the generic nature of the valve body, said third pressure can be lower than, equal to or higher than said second pressure. However, said third pressure is preferably lower than or equal to the second pressure.

According to another non-limiting aspect, said third interface comprises third connection means. According to an embodiment, said third connection means are threaded means. According to another embodiment, said third connection means are connection means by interference. According to another non-limiting aspect, said third connection means comprise a housing seat for a seal gasket, for example an O-ring, in order to minimize the risk of fluid leaking at the third connection means. It should be noted that other embodiments equivalent to those mentioned above can be taken on by the third connection means without this significantly affecting the shape of the cartridge and the purpose of the present disclosure.

According to another aspect, the cartridge comprises a passage adapted to place in fluid communication said first interface and said second interface. In particular, said passage is adapted to allow the flow of said fluid from said first interface to said second interface. In other words, the passage defines a path obtained in the main body of the cartridge that connects said first interface and said second interface in order to place them in fluid communication to each other and allow the fluid flow between them.

According to an aspect, said passage develops in said main body substantially along a first direction. According to a non-limiting aspect, said first direction coincides with a first main axis of the cartridge, for example with a longitudinal development axis of the cartridge.

According to an aspect, said cartridge comprises an internal chamber. According to this aspect, said internal chamber results to be traversed by said passage, i.e. said passage from said first interface and said second interface is passing through said internal chamber.

According to another aspect, said internal chamber is in fluid communication with said third interface. Specifically, said internal chamber develops in said main body starting from said third interface along the second direction. In other words, said internal chamber appears as a cavity obtained in said main body starting from the third interface and that develops in the main body along the second direction.

It should be noted that said passage and said internal chamber are in fluid communication. Specifically, said passage is open on said internal chamber, i.e. said passage constitutes at least part of said internal chamber. Therefore, the passage does not appear as a duct having walls that separate it from said internal chamber, but constitutes part of the internal chamber itself. This aspect will be clearer hereinafter in the present document. According to an aspect of the present invention, said second direction results to be not parallel to said first direction.

According to a non-limiting aspect, said second direction forms with said first direction an angle comprised between 30° and 150°. According to another non-limiting aspect, said second direction forms with said first direction an angle comprised between 60° and 120°. According to yet another non-limiting aspect, said second direction forms with said first direction an angle 90°, i.e. said first direction and said second direction are orthogonal to each other.

According to a non-limiting aspect, said main body comprises a first base surface, a second base surface and at least a lateral surface. According to another non-limiting aspect, said first interface is placed at said first base surface, said second interface is placed at said second base surface and said third interface is placed at said at least a lateral surface. In other words, said first interface, second interface and third interface appear as openings, respectively, in said first base surface, second base surface and at least a lateral surface. According to another non-limiting aspect, said main body has a substantially cylindrical shape having two base surfaces and a lateral surface. According to this aspect, said first interface is placed at the first base surface, said second interface is placed at the second base surface and the third interface at the lateral surface. Always according to this aspect, the passage traverses longitudinally said main body from the first base surface to the second base surface, i.e. in substantially parallel manner with respect to its longitudinal development coinciding with the first direction. According to another non-limiting aspect, better clarified hereinafter, the passage has at least more tracts or portions, of which at least one is preferably parallel to the first direction. These tracts can be aligned along said first direction or be angulated or misaligned between them, still maintaining an overall development of the passage parallel to the first direction.

According to another aspect, the cartridge comprises a shutter movably housed in said internal chamber. Specifically, said shutter separates said third interface from said passage. Consequently, with the cartridge mounted, the passage and the third interface are not in fluid communication. The fluid at the third inlet pressure at the third interface does not flow in the passage because of the presence of the shutter and, analogously, the circulating fluid inside the passage does not reach the third interface.

According to another aspect, the shutter is active on said passage, i.e. said shutter is operatively associated to said passage. In particular, said shutter is active on said passage in order to interfere with said passage. More specifically, said shutter is active on said passage to obstruct it at least partially in a selective and variable manner and to apply a reduction factor between said first pressure and said second pressure. According to this aspect, the shutter is configured for obstructing the fluid flow from the first interface to the second interface and applying, according to the obstruction grade, an opportune reduction ratio in order to bring the pressure value of the fluid entering the cartridge (first pressure) at a lower or equal value to bring entering the valve body (second pressure).

According to an aspect, the shutter is configured for positioning as an at least partial obstruction of said passage. In particular, said shutter interferes with said passage for causing a shrinkage in at least a position of the passage through which the fluid transits from the first interface to the second interface. Contextually, the shutter reduces the pressure of the circulating fluid by applying a reduction factor that depends on the position taken on in the internal chamber.

It should be noted that a shrinkage of the passage useful to the flow of the fluid—therefore a higher interference degree operated by the shutter—corresponds to a higher damping effect of the pressure, i.e. to a higher reduction factor between the first pressure and the second pressure. Vice versa, an increase of the section of the passage useful to the flow of the fluid—then a lower interference degree operated by the shutter—corresponds to a lower damping effect of the pressure, i.e. to a lower reduction factor between the first pressure and the second pressure.

According to an aspect, said shutter is movable along the second direction at least between the following positions:

a minimum interference position with the passage, wherein the obstruction of said passage is cartridge for and the reduction factor between said first pressure and second pressure is minimum;

a maximum interference position with the passage, wherein the obstruction of said passage is maximum and the reduction factor between said first pressure and second pressure is maximum;

at least an intermediate position between said minimum interference position and said maximum interference position, wherein reduction factor takes on an intermediate value between said minimum value and maximum value.

According to a non-limiting aspect, said shutter is mobile seamlessly between said minimum interference position and said maximum interference position, i.e. said shutter can take on any intermediate position between said minimum interference position and maximum interference position. In other words, said shutter can take on infinite intermediate continuous positions between said minimum interference position and maximum interference position.

According to an aspect, the position of said shutter is determined by said first inlet pressure and said third outlet pressure, i.e. the position taken on by the shutter is conjointly depending on said first pressure and said third pressure. According to this aspect, the obstruction degree of the passage operated by the shutter is simultaneously determined by the values taken on by the first pressure of the inlet fluid at the cartridge and the third pressure of the outlet fluid at the valve body.

According to a non-limiting aspect, the position of said shutter is determined by a comparison between said first inlet pressure and said third outlet pressure. According to this aspect, the obstruction degree of the passage operated by the shutter is determined by a comparison between the first inlet pressure at the cartridge and the third outlet pressure at the valve body.

According to yet another non-limiting aspect, the position of said shutter is determined by a difference between said first inlet pressure and said third outlet pressure. The governing principles of the movement of the shutter will be clearer hereinafter in the present description with the introduction of other aspects of the interested cartridge.

According to a non-limiting aspect, said shutter develops around a main extension axis. Preferably, said main extension axis is the axis along which the shutter mostly develops, i.e. the axis containing the dimension of the main development of the shutter itself. According to another non-limiting aspect, said main extension axis is, in use, parallel to, or coinciding with, said second movement direction of the shutter. In other words, the shutter moves in said internal chamber along said second direction maintaining the main extension axis parallel to, or coinciding with the, movement direction.

According to another non-limiting aspect, said shutter has a symmetric structure with respect to said main extension axis, i.e. at each point of the shutter corresponds a respective point of the shutter that is symmetric with respect to said main extension axis.

It should be noted that the whole structure of the cartridge is substantially symmetric. This feature allows the cartridge to work also in a reverse or overturned configuration, i.e. with a fluid entering the second interface and exiting from the first interface. The nomenclature used in the present document is purely conventional and both the interfaces placed on the sides of the passage can be used as inlet interface or outlet interface according to the needs and components connected to them.

According to a non-limiting aspect, the shutter comprises a support portion and an interference portion. In particular, said support portion is configured for movably housing along said second direction said shutter in said internal chamber. Said interference portion is active on said passage in order to at least partially obstruct it in a selective and variable manner. According to this aspect, the shutter comprises at least two main portions: the support portion, configured for maintaining the connection of the shutter to the main body of the cartridge and allowing its housing in movable manner at said internal chamber, and the interference portion, adapted to obstruct the passage between the first interface and the second interface in a selective and variable manner according to the position taken on by the shutter itself in order to adapt the reduction ratio between the first pressure and the second pressure.

According to a non-limiting aspect, said support portion and said interference portion are positioned at opposite ends of the shutter along its main extension axis. Therefore, the shutter has the support portion at an end thereof along the main extension axis and the interference portion at an opposite end.

According to yet another non-limiting aspect, said support portion and said interference portion are integral with each other, i.e. are connected without possibility of relative movement.

According to another aspect, said support portion is sealed with said internal chamber, i.e. an external surface of said support portion adheres to the walls of the internal chamber. According to another non-limiting aspect, said support portion comprises a seat for housing a seal gasket. Said seal gasket is configured for avoiding the leakage of fluid between the walls of the internal chamber and the external surface of the support portion. In this sense, the seal between said support portion and the internal chamber contributes to the interruption of the fluid connection between said passage and said third interface.

According to a non-limiting aspect, said support portion comprises a dividing wall. According to a non-limiting aspect, said dividing wall is connected to said interference portion, i.e. constitutes the contact point of the support portion with the interference portion.

According to an aspect, said dividing wall divides said internal chamber in a first sub-chamber and a second sub-chamber. Specifically, said dividing wall is configured for plugging said internal chamber, by interrupting, in combination with the seal between the support portion and the internal walls of the internal chamber, the fluid communication between said passage and said third interface.

According to another non-limiting aspect, the presence of the support portion provided with the dividing wall determines, then, the creation of said first sub-chamber and second sub-chamber not in fluid communication between them.

According to another aspect, said first sub-chamber contains said interference portion of the shutter and contains at least partially the passage, i.e. the passage is at least partially defined in said first sub-chamber. According to yet another aspect, said second sub-chamber is in fluid communication with said third interface. In particular, said second sub-chamber is in continuity with said third interface.

According to a non-limiting aspect, said dividing wall has a mainly plane development. According to another non-limiting aspect, said dividing wall develops in a direction substantially orthogonal to the main extension axis of said shutter.

According to a non-limiting aspect, said dividing wall comprises a first side directed, in use, towards the first sub-chamber and configured for being affected by said inlet fluid at the first pressure. According to this aspect, the dividing wall comprises a second side, opposite to said first side and directed towards said second sub-chamber in order to be affected by said fluid at said third pressure entering from said third interface.

In this sense, being affected on the opposite sides thereof both by the fluid at the first pressure and by the fluid at the third pressure, the dividing wall determines the position taken on by the shutter. The fluids at the two pressures simultaneously press, with the same direction but opposite directions, on the dividing wall and cause the movement of the whole shutter. In principle, in absence of other elements placed as obstacle of the movement of the shutter, when the first pressure is higher than the third pressure, the dividing wall undergoes a force that places it near the third interface. Vice versa, when the third pressure is higher than the first pressure, the dividing wall undergoes a force that moves away from the third interface.

According to a non-limiting aspect, the maximum interference position of the shutter corresponds to a position of maximum proximity of the dividing wall to the third interface. This position corresponds to a situation wherein the first pressure is too high relative to the third pressure, then it is necessary the maximum level of interference and, then, of reduction of the pressure (maximum value of the reduction ratio).

According to a non-limiting aspect, the minimum interference position of the shutter corresponds to a position of maximum distance of the dividing wall to the third interface. This position corresponds to a situation wherein the first pressure is insufficient relative to the third pressure, then it is necessary the minimum level of interference and, then, of reduction of the pressure (minimum value of the reduction ratio).

According to a non-limiting aspect, said interference portion comprises an obstructing sector and a transition sector. According to this aspect, the obstructing sector is configured for operating a greater interference with said passage with respect to said transition sector. Then, the obstructing sector is adapted to operate a localized shrinkage of the passage higher with respect to the one operated by the transition sector.

According to a non-limiting aspect, said transition sector is a sector of the interference portion proximal with respect to the support portion along said main extension axis. On the contrary, said obstructing sector is a distal sector with respect to the support portion along said main extension axis. In other words, said transition sector is interposed between said obstructing sector and said dividing wall along said main extension axis.

According to another aspect, said transition sector has a tapered shape having increasing section along the main extension axis in a direction approaching said obstructing sector or, equivalently, in a direction away from said dividing wall. According to this aspect, the section of said transition portion in a plane orthogonal to said main extension axis increases with the proximity to the obstructing sector and decreases with the proximity to the support portion, specifically to the dividing wall.

According to another non-limiting aspect, said passage comprises:

a first section developing between said first interface and said internal chamber;

a second section developing in said internal chamber and defined by said internal chamber and said shutter;

a third section developing between said internal chamber and said second interface.

According to this aspect, said first section, second section and third section appear as three consecutive parts composing said passage in the main body between the first interface and the second interface.

According to a non-limiting aspect, the first section comprises a first opening facing said internal chamber. In this sense, the first section is configured for placing in fluid communication said first interface and said internal chamber for bringing the fluid at the first pressure to the internal chamber through said first opening. According to this aspect, said second section is in fluid communication with said first section at said first opening. According to yet another aspect, the third section of the passage comprises a second opening facing said internal chamber. According to this aspect, said third section is in fluid communication with said second section at said second opening. The third section is then configured for bringing the fluid at the second pressure from the internal chamber to the second interface for being then sent to said valve body.

According to another non-limiting aspect, said first section and third section have fixed shape and position. Specifically, said first section and third section are obtained in said main body and are non-deformable. According to another non-limiting aspect, said second section is defined by said internal chamber and said shutter. In detail, it is defined in said first sub-chamber by the walls by the internal chamber, by said dividing wall and by said interference portion of said shutter. Then, the second passage is constituted by the portion of the first sub-chamber comprised between said dividing wall and said obstructing sector and left free from said interference sector. According to this aspect, said second section of the passage varies according to the position taken on by said shutter. More in particular, said second section is configured for translating along said second direction according to the position taken on by said shutter.

According to another non-limiting aspect, said shutter is configured for obstructing at least partially said first opening and/or said second opening at least when it is in said maximum interference position and said at least an intermediate position. In particular, the obstruction degree of said first opening and/or said second opening operated by said shutter is function of the position taken on by the shutter itself.

According to a non-limiting aspect, said obstructing sector of the shutter is configured for substantially obstructing said first opening and/or said second opening. According to the position taken on by the shutter, the obstructing sector affects a variable portion of said first opening and/or said second opening and then the obstruction degree operated is variable. Said obstructing sector represents a part of the interference portion maximumly near the walls of the internal chamber. Then, when the position of the shutter is such that said obstructing sector interferes at least partially with said first opening and/or said second opening, they result at least in part substantially plugged. It should be noted that, according to the present invention, the terms "substantially obstructing" and "substantially plugged" do not exclude the possibility of a leakage of fluid between the external surface of the obstructing sector and the walls of the internal chamber. Then, it is not necessary that the obstructing sector strikes against the walls of the internal chamber, but that the leakage of the fluid between the obstructing sector and the walls of the internal chamber is controllable.

According to another non-limiting aspect, said transition sector of the shutter is spaced from the walls of the internal chamber. Independently from the shape taken on, the transition sector does not strike against the walls of the internal chamber and defines the second section of the passage. Then, when the position of the shutter is such that said transition sector interferes at least partially with said first opening and/or said second opening, they result at least in part substantially free.

According to another non-limiting aspect, when said shutter is in said maximum interference position, said obstructing sector obstructs said first opening and/or said second opening in an almost substantially total manner. According to this aspect, when said shutter is in said maximum interference position, said interference portion obstructs said first opening and/or said second opening almost only with the obstructing sector. Said first opening and/or said second opening result, then, substantially almost plugged. Consequently, the reduction factor of the pressure applied by the cartridge is maximum.

According to yet another non-limiting aspect, when said shutter is in said minimum interference position, said obstructing sector does not affect said first opening and said second opening. According to this aspect, when said shutter is in said minimum interference position, said interference portion affects said first opening and said second opening almost only with the transition sector. Said first opening and said second opening result, then, substantially free. Consequently, the reduction factor of the pressure applied by the cartridge is minimum. According to another non-limiting aspect, when said shutter is in said at least an intermediate position, said obstructing sector obstructs said first opening and/or said second opening in a partial manner. In other words, when said shutter is in said at least an intermediate position, said interference portion affects said first opening and/or said second opening simultaneously with said obstructing sector and said transition sector. Said first opening and said second opening result, then, neither completely free nor completely plugged. Consequently, the reduction factor of the pressure applied by the cartridge is intermediate between said minimum value and maximum value.

According to a non-limiting aspect, said obstructing sector has at least a groove at an external surface thereof facing the walls of the internal chamber. Specifically, said at least a groove prevents that said obstructing sector obstructs completely said passage when said shutter is in said maximum interference position. In other words, said at least a groove consists in a recess that develops on the whole external surface of said obstructing sector. According to this aspect, said groove defines at least partially said passage. Then, the at least groove is in fluid communication with said first section and said second section. Consequently, the groove contributes to the passage for the flow of fluid between said first interface and said second interface and then defines at least part of said passage.

According to another aspect, said cartridge comprises a return element, operatively associated to said shutter. Specifically, said return element is configured for hindering the movement of said shutter towards the maximum interference position. According to this aspect, said return element is configured for maintaining said shutter in the minimum interference position in the absence of fluid flow or when the difference between the first pressure of the fluid entering the first interface and the third pressure of the fluid entering the third interface is lower than a determined threshold. Then, the return element operates an action additional to the third pressure of the fluid entering the third interface and promotes the return of the shutter in the minimum interference position and the maintenance of this position when the first pressure is not sufficiently high relative to the third pressure. In fact, if the first and the third pressure have substantially the same value, the shutter would not be subjected to any force and would result inert. The action of the return element allows to return the shutter in the minimum interference position due to the fact that no reduction of the pressure is necessary. The shutter maintains the minimum interference position with a determined inertia until the first pressure does not increase relative to the third pressure in a sufficient manner to win the resistance of the return element and of the third pressure. Consequently, the shutter is moved towards the maximum interference position because there is the need to reduce the second pressure of the fluid entering the valve body by applying a reduction factor higher on the first pressure.

According to another non-limiting aspect, said cartridge comprises an abutment element for said return element. Preferably, said return element is positioned at said third control interface, in particular at the opening of said third interface on the external surface of said main body. Always preferably, said return element is connected to said interface through said third connection means.

According to another aspect, said return element insists between said shutter, preferably at said second side of the dividing wall and said abutment element.

According to an embodiment, said return element is a spring, preferably a compression spring. According to an aspect, when said shutter is in the minimum interference position, said return element is in a rest or a preloading condition. On the contrary, when said shutter is in the maximum interference position or in the at least an intermediate position, the return element is in a compression or extension condition. In this manner, when the shutter is in the maximum interference position or in the least an intermediate position, the return element exerts a force, in addition to the third pressure, such as to push the shutter in the minimum interference position. If the difference between the first and the third pressure is not sufficient to withstand this return action, the shutter is moved towards the minimum interference position.

In said embodiment, the elastic constant of said spring can be set during the design step of the cartridge for adjusting the resistance opposite to the compression and the relative return action. The higher the resistance to the contraction is, the lower is the contraction of the return element in comparison with the first pressure and the third pressure themselves and then the lower is the reduction factor between the first pressure and the second pressure. In this manner it is determined also the minimum threshold of the first pressure sufficient to move said shutter.

According to another non-limiting aspect, the abutment element is a perforated cap, i.e. a cap showing at least a passing hole adapted to allow the inlet of the fluid at the third pressure in the internal chamber, in particular in the second sub-chamber. Preferably, said perforated cap is positioned at said third interface, preferably at the opening of the third interface on the external surface of said main body. In other words, said perforated cap is positioned substantially flush with the external surface of the main body.

According to another aspect, the present disclosure refers to a device for treating a fluid. With the term "treating a fluid" it is intended any action adapted to modify the dynamic and/or structural and/or organoleptic properties of the fluid. Typical examples of a fluid are the adjustment of the flow and/or of the pressure, the heating/cooling, the filtering, the mixing. The device for treating according to the present invention finds application in particular in the context of adjustment of the flow and/or of the pressure of a circulating fluid through the device for treating itself.

According to an aspect, the device for treating a fluid comprises the cartridge for dynamic reduction of the pressure previously described.

According to another non-limiting aspect, the device for treating a fluid is connectable to an inlet duct. Said inlet duct is connected to said first inlet interface of the cartridge in order to send to said cartridge the fluid at the first pressure. Said fluid at the first pressure enters in said cartridge and is subjected to a pressure reduction from a value equal to the first pressure to a value equal to the second pressure, the latter, as previously shown, being lower than or equal to the value of the first pressure. As already described, the reduction factor between the first pressure and the second pressure is determined by the position taken on by the shutter with respect to the passage between the first and the second interface of the cartridge. When the shutter is in the minimum interference position, the reduction factor of the pressure is minimum. When the shutter is in the maximum interference position, the reduction factor of the pressure is maximum. According to a non-limiting aspect, said inlet duct is a tube of a hydraulic plant.

According to another aspect, the device for treating a fluid comprises a valve body configured for carrying out a treatment of a fluid. Said valve body results in fluid communication with the second interface of said cartridge in order to receive said fluid at the second pressure, i.e. the fluid at the pressure reduced by the cartridge. According to this aspect, the valve body is configured at least for bringing said fluid to a third pressure. According to the operating conditions of the valve body, said third pressure can be different from said second pressure, preferably lower, or can be substantially equal to said second pressure.

According to a non-limiting aspect, said valve body comprises an inlet opening. Said inlet opening is in fluid communication with said second interface of the cartridge to receive said fluid at the second pressure. In other words, the fluid at the second pressure exiting the second interface of the cartridge is sent to the inlet opening of the valve body for undergoing the relative treatment and being then brought to the third pressure.

According to another non-limiting aspect, said valve body comprises an outlet opening. Said outlet opening is configured for the outflow of said fluid at the third pressure from said valve body. Typically, said outlet opening is connected to an outlet duct. Then, the fluid, after having undergone said treatment and having been brought to the third pressure, is expelled from said valve body through said outlet opening to enter in said outlet duct.

According to another aspect, said device is configured for placing in fluid communication said outlet opening with said third interface to send to said cartridge the fluid at the third pressure. In this way, there is a retroaction mechanism, already previously shown, that provides for adjusting the reduction factor applied by the cartridge according to the first pressure entering the cartridge and to the third pressure exiting from the valve body.

According to yet another non-limiting aspect, said valve body comprises means for controlling the flow. Said means for controlling the flow result interposed between said inlet opening and said outlet opening. In particular, said means for controlling the flow are configurable to adjust the flow of the fluid outflowing from said valve body and then the flow rate through said outlet opening. According to another non-limiting aspect, said means for controlling the flow are configurable in a selective manner to adjust the flow of the fluid exiting from said valve body through said outlet opening.

According to a non-limiting aspect, said means for controlling the flow comprise a ring provided with a plurality of openings having different section for controlling the flow. Specifically, said plurality of openings for controlling the flow are each one configured for being positioned at said outlet opening. In other words, according to the position taken on by the ring, one of the openings for controlling the flow can be positioned at the outlet opening for matching with it and allow the fluid to pass through said outlet opening of the valve body and flow in said outlet duct. The section of each opening for controlling the flow determines the maximum flow exiting from said valve body and then the maximum flow rate of the fluid through said outlet opening.

According to another non-limiting aspect, said device comprises adjustment means of said means for controlling the flow. Said adjustment means are, then, operatively associated to said means for controlling the flow and are configured for moving said ring. Specifically, said adjustment means are configured for selectively positioning an opening of said plurality openings for controlling the flow at said outlet opening, so that it matches at least partially with the section of the outlet opening and determines the maximum flow rate exiting from said valve body. According to an embodiment, said adjustment means are manually operable, preferably by means of the use of an opportune tool.

According to another non-limiting aspect, said valve body is a thermostatic valve. This thermostatic valve is of substantially known type and will not then be described in detail in the present document.

According to another non-limiting aspect, said means for controlling the flow comprise a second shutter. Said second shutter is interposed between said inlet opening and said ring. In particular, said second shutter is connected to a control stem actuatable, externally to said valve body, by further control means for varying a section of the passage useful to the flow of the fluid in the valve body. In other words, said further control means are connectible to said thermostatic valve to actuate said stem and, then, move said second shutter. In this way it is modified the section useful to the passage of the fluid in the valve body. According to another non-limiting aspect, said further control means comprise a thermostatic head associable with said thermostatic valve. Said thermostatic head is of known type too and then not described in detail in the present document.

According to another non-limiting aspect, the device for treating a fluid comprises an outlet duct. Said outlet duct is in fluid communication with said valve body to receive said fluid at the third pressure outflown by means of said outlet opening. In other words, the outlet duct is a duct wherein said empty valve body, through said outlet opening, the fluid treated and brought to the third pressure.

According to another aspect, said outlet duct is in fluid communication with said third interface of the cartridge. According to this aspect, said outlet duct is configured for sending to said cartridge, in particular to the third interface, the fluid at the third pressure.

Typically, said outlet duct is then connected to other elements of a hydraulic plant, that will not be described in the present document because they fall outside of the context of the present invention.

According to an embodiment, said third interface of the cartridge is directly facing said outlet duct for receiving the fluid at the third pressure. According to this embodiment, then, said cartridge and said outlet duct are in direct fluid communication, i.e. without the interposition of other elements. Then, the fluid at the third pressure circulating in said outlet duct enters directly in said third interface through the relative opening, which results directly facing said outlet duct.

According to another embodiment, said device comprises a control duct connected to said outlet duct and to said third interface in order to place it in fluid communication. In this embodiment, the outlet duct and the cartridge are in indirect fluid communication, i.e. by means of the interposition of other elements, such as, precisely, the control duct. Specifically, said control duct has an end connected to said outlet duct and the opposite end connected to said third interface, preferably at said third connection means. This control duct is then configured for sending to said third interface the fluid at the third pressure circulating in said outlet duct. This embodiment allows the cartridge and the valve body to be placed at a distance the one from the other, i.e. not in direct contact.

In an embodiment, said cartridge and said valve body are directly connected. Specifically, said cartridge and said valve body are directly connected at said second interface, preferably through said second connection means. According to said embodiment, then, said cartridge and said valve body are in direct fluid communication, i.e. without the interposition of further elements. Then, the fluid at the second pressure exiting from said second interface of the cartridge directly enters in said inlet opening of the valve body.

In another embodiment, said device comprises an intermediate duct interposed between said cartridge and said valve body. According to this embodiment, said intermediate duct has an end connected to said valve body, preferably at the inlet opening, and an end opposite connected to said second interface, preferably at said second connection means. In this embodiment, the valve body and the cartridge are in indirect fluid communication, i.e. by means of the interposition of further elements, such as, precisely, the intermediate duct. The intermediate duct is then configured for placing in fluid communication said valve body with said second interface and for allowing the flow of the fluid at the second pressure from the second interface to the inlet opening.

According to another aspect, the present disclosure refers to a mounting method of a device for treating a fluid.

According to an aspect, the mounting method comprises the following steps:

arranging a main body comprising:
- a first inlet interface;
- a second outlet interface;
- a third control interface;
- a passage developing in a first direction in order to place in fluid communication said first inlet interface and said second outlet interface;
- an internal chamber traversed by said passage and in fluid communication with said third interface, said internal chamber developing along a second direction not parallel to said first direction;

arranging a shutter;

mounting a cartridge for dynamic reduction of the pressure movably housing said shutter in said internal chamber in order to at least partially interfere with said passage and to separate said passage from said third interface, said shutter being movable along a second direction in order to modify a degree of interference with said passage;

associating a valve body to said second outlet interface in order to transmit fluid at the second pressure from said cartridge to said valve body.

It should be noted that the aspects of the components involved in the present mounting method have been previously introduced in detail with reference to the cartridge for dynamic reduction of the pressure and to the device for treating a fluid, object of the present invention too.

According to another non-limiting aspect, said step of mounting a cartridge provides that said first direction and said second direction form an angle between them comprised between 30° and 150°. Preferably, said angle is comprised between 60° and 120°. Even more preferably, said first direction and said second direction are orthogonal to each other, i.e. said angle is substantially equal to 90°.

According to another non-limiting aspect, said mounting method comprises one or more of the following steps;

associating an inlet duct to said first inlet interface in order to send said fluid at the first pressure to said cartridge;

associating said valve body to an outlet duct in order to send to said outlet duct said fluid at the third pressure;

associating said outlet duct to said third interface of the main body to send to said cartridge said fluid at the third pressure.

According to another non-limiting aspect, said step of associating a valve body to said second outlet interface provides for one of the following solutions:

directly connecting said valve body at the second interface;

arranging an intermediate duct interposed between said valve body and said second interface in order to place in fluid communication said valve body and said cartridge.

According to another non-limiting aspect, said step of associating said outlet duct to said third interface of the main body provides for one of the following solutions:

directly connecting said third interface to said outlet duct;

arranging a control duct interposed between said outlet duct and said third interface in order to place in fluid communication said outlet duct and cartridge.

It is also object of the present disclosure a method for treating a fluid. According to an aspect, the method for treating a fluid comprises at least the following steps:

mounting a device for treating a fluid according to the mounting method previously shown;

sending to said first interface the fluid at the first pressure;

reducing the pressure of said fluid by means of said cartridge for dynamic reduction of the pressure, bringing the pressure of the fluid from said first pressure to said second pressure;

sending said fluid at the second pressure to said valve body;

treating said fluid by means of said valve body, bringing the fluid to the third pressure;

sending said fluid at the third pressure from said outlet opening of the valve body to said third opening of the cartridge by means of said outlet duct.

SHORT DESCRIPTION OF FIGURES

Some embodiments and some aspects of the invention will be hereinafter described with reference to the attached figures, provided only with indicative and therefore non-limiting purpose, wherein:

FIGS. 3A-3C are a perspective view, a front view and a sectional view according to the plane IIIC-IIIC of a component of the cartridge for dynamic reduction of the pressure according to the present invention;

FIG. 6 is a front view of an exploded view of the device for treating a fluid in FIG. 5A thereof;

FIG. 7 is a sectional view according to the plane VII-VII of the exploded view of the device for treating a fluid of FIG. 6;

FIG. 14 shows by means of a flow chart some steps of a mounting method of a device for treating a fluid according to the present invention;

DEFINITIONS AND CONVENTIONS

It should be observed that in the present detailed description corresponding parts shown in the various figures are indicated with the same numerical references. Figures could show the object of the invention through unscaled representations; thus, parts and components shown in figures related to the object of the invention could refer exclusively to the schematic representations.

The terms "upwards" and "downwards" refer to a direction of flow advancement of the fluid through the cartridge for dynamic reduction of the pressure or through the adjustment device of the flow according to the present invention or with respect to a direction of flow advancement of the fluid in a hydraulic plant comprising said cartridge and/or said device. The fluid can be a liquid, for example water of a water supply network.

As previously determined, in the context of the present invention, the terms "fluid" and "liquid" can be considered synonymous. Then, notwithstanding their gender-species relationship, the terms "fluid" and "liquid" will be used interchangeably given the application of the invention to the field of hydraulic plants.

With the term "treating of a fluid" it is intended any action adapted to modify the dynamic and/or structural and/or organoleptic properties of the fluid. Typical examples of a fluid are the adjustment of the flow and/or of the pressure, the heating/cooling, the filtering, the mixing. The present invention finds application in particular in the context of adjustment of the flow and/or of the pressure of a circulating fluid in a hydraulic plant.

DETAILED DESCRIPTION

With reference to the attached figures, with the numerical reference 1 has been indicated as a whole a cartridge for dynamic reduction of the pressure of a fluid intended for a valve body 2. In particular, the present disclosure concerns a cartridge 1 for reduction of the pressure of a liquid intended for undergoing a treatment from the valve body 2.

As it will be explained with reference to the attached figures, said cartridge 1 is configured for receiving an inlet fluid and reducing the pressure thereof according to a comparison between the pressure of the inlet fluid and the pressure of the fluid downwards of the valve body 2.

Figures 1A, 1B, 1C:
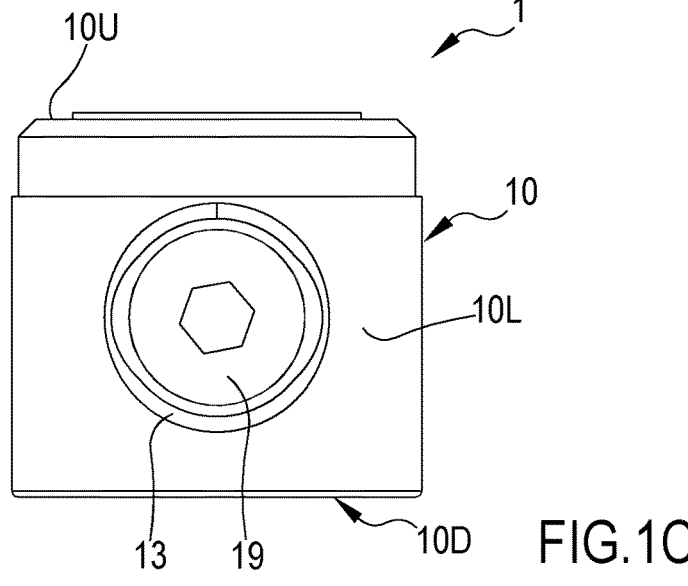
FIGS. 1A-1E show a plurality of views (1A: perspective, 1B: front plane, 1C: lateral plane, 1D: upwards plane, 1E: downwards plane) of the cartridge for dynamic reduction of the pressure of a liquid according to the present invention according to an embodiment.
Figures 1D, 1E, 2:
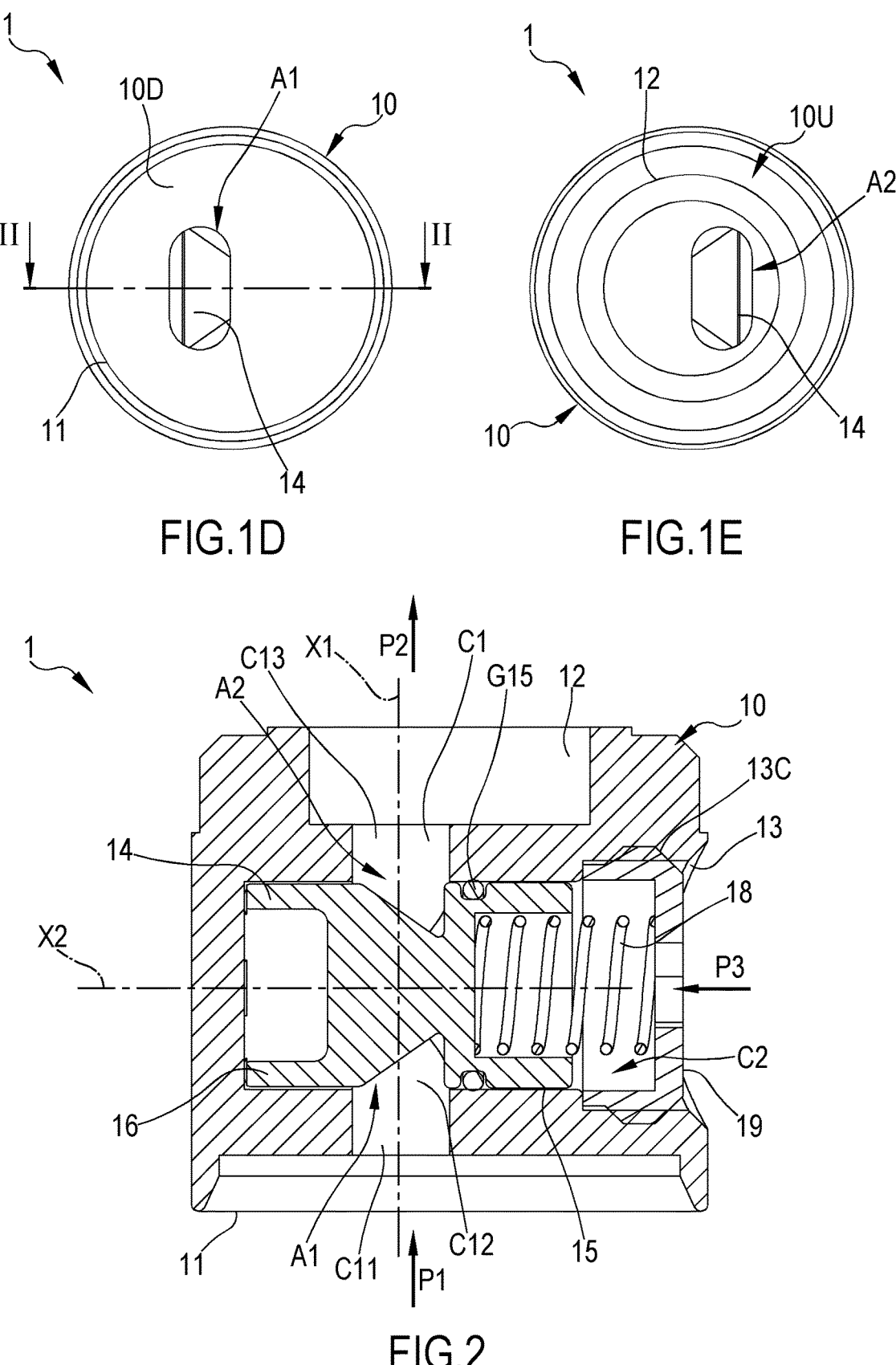
FIG. 2 is a sectional view according to the plane II-II of the cartridge for dynamic reduction of the pressure in FIGS. 1A-1E thereof.

In FIGS. 1A-1E and in FIG. 2 it is shown an exemplificative and non-limiting embodiment of the cartridge 1 according to the present invention in various views that help in the understanding of various aspects of the cartridge itself. In particular, FIG. 2 shows a sectional view along a longitudinal plane that allows to appreciate the internal shape of the cartridge 1 and the positioning of the various components.

As shown in FIGS. 1A-1E, the cartridge 1 comprises a main body 10. Said main body 10 constitutes the bearing structure—or case—of the cartridge 1 and allows the housing of other components of the cartridge 1, as shown for example in FIG. 2.

In the embodiment shown in the attached figures, the main body 10 comprises a first base surface 10D, a second base surface 10U and at least a lateral surface 10L. Specifically, in the shown embodiment, the main body 10 has a substantially cylindrical shape having a first base surface 10D, a second base surface 10U and a lateral surface 10L. This shape is to be intended in an exemplificative and absolutely non-limiting sense because the main body 10 can take on further shapes according to the application for which it is intended.

As shown, the main body 10 comprises a first inlet interface 11. Said first interface 11 is configured for receiving the fluid at a first pressure P1. Specifically, the first interface 11 appears as an opening, having variable depth according to the applications, obtained in said main body 10 through which it is received the fluid at the first pressure P1 in order to undergo a reduction treatment of the pressure. Preferably, as shown in detail in FIG. 1D, the first interface 11 is placed at the first base surface 10D.

Figures 5A, 5B, 5C:
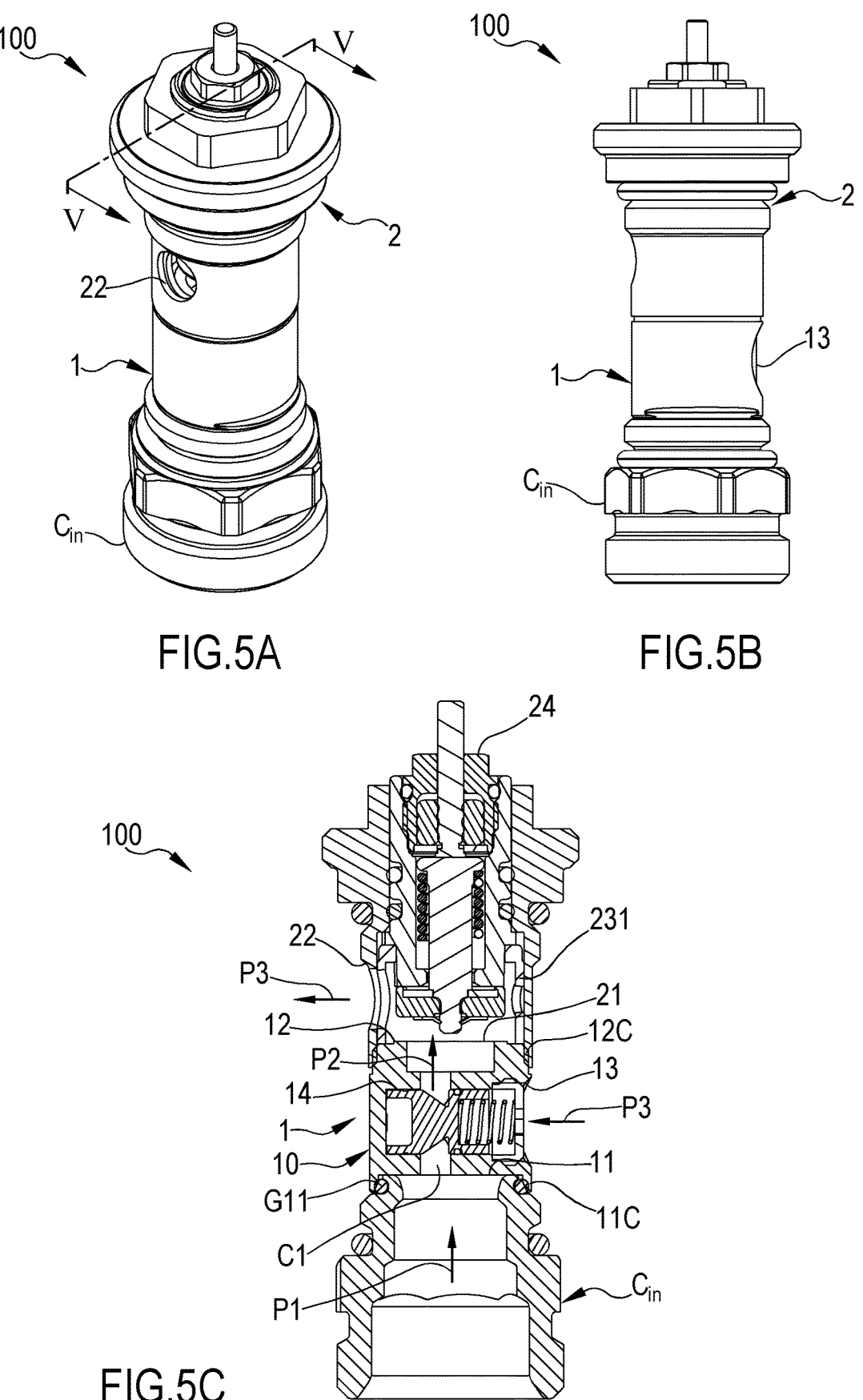
FIGS. 5A-5C are a perspective view, a front view and a sectional view according to the plane V-V according to a front plane of the device for treating a fluid according to the present invention in an embodiment.

As shown in FIGS. 5A-5C, the first interface 11 is connectible to an inlet duct Cin through which the fluid at the first pressure P1 flows for entering the main body 10 and for being then subjected to a reduction treatment of the pressure that will be hereinafter described.

Said first interface 11 comprises furthermore first connection means 11C to said inlet duct Cin. In the shown embodiment, said first connection means 11C are connection means by interference. As shown in FIG. 5C, said first connection means 11C comprise a housing seat for a seal gasket G11, for example an O-ring, for minimizing the risk of fluid leaking between the cartridge 1 and the inlet duct Cin at first connection means 11C. According to an alternative embodiment, said connection means 11C are threaded means. It should be noted that embodiments equivalent to those mentioned above can be taken on by the first connection means 11C without this significantly affecting the shape of the cartridge.

Furthermore, the main body 10 comprises a second outlet interface 12. Said second interface 12 is configured for sending to said valve body 2 the fluid at a second intermediate pressure P2. Specifically, the second interface 12 appears as an opening, having variable depth according to the applications, obtained in said main body 10 through which the fluid subjected to the reduction treatment of the pressure, i.e. the fluid at the second pressure P2, exits the cartridge 1 and is sent to the valve body 2. Always preferably, as shown in FIG. 1E, said second interface 12 is placed at the second base surface 10U.

It should be noted that said second pressure P2 is lower than or equal to said first pressure P1. In fact, as mentioned, the cartridge 1 is a cartridge for dynamic reduction of the inlet pressure at a valve body 2. Being the pressure of the fluid sent to the valve body equal to the second pressure P2, it is implicit that the value of the second pressure P2 cannot exceed the value of the pressure at the cartridge itself, that is equal to the first pressure P1.

The second interface 12 results to be connectible, directly or indirectly through an intermediate duct, to the valve body 2 to which the liquid at the second pressure P2 is sent for another treatment that will be hereinafter described. According to an embodiment, the cartridge 1 is installed in direct contact with the valve body 2, i.e. without the interposition of other elements as shown in FIGS. 5A-5C. According to a non-shown embodiment, the cartridge 1 is installed in indirect contact with the valve body 2, i.e. through the interposition of third means, such as ducts or joints.

The second interface 12 comprises second connection means 12C to said valve body 2 or to said intermediate duct. According to an embodiment, shown as example in FIG. 5C, said second connection means 12C are threaded means. According to another non-shown embodiment, said second connection means are connection means by interference or other functionally analogous connection typologies. According to the embodiment, said second connection means 12C can provide for a housing seat for a seal gasket, for example an O-ring, in order to minimize the risk of fluid leaking at the second connection means 12C between the cartridge and the valve body or, equivalently, between the cartridge and the intermediate duct.

Said main body 10 comprises also a third control interface 13. Said third interface 13 is configured for receiving the fluid at a third outlet pressure P3 from the valve body 2. Then, the third interface 13 appears as an opening, having variable depth according to the applications, obtained in said main body 10 and through which it is received the fluid exiting from the valve body 2 at the third pressure P3, i.e. the fluid that has been subjected both to the reduction treatment of the pressure by the cartridge 1 and to the treatment to which the valve body 2 is designated. Preferably, as shown in FIGS. 1A and 1C, said third interface 13 is placed on the lateral surface 10L of said main body 10.

Said third interface 13 is connectible to a duct through which the fluid at the third pressure P3 exiting from the valve body 2 reaches again the cartridge 1 in order to affect the dynamic behaviour thereof, as it will be described hereinafter with more details.

Preferably, said third interface 13 comprises third connection means 13C, for the connection, for example, to said control duct or for allowing the housing of further components of the cartridge. According to an embodiment, shown in FIG. 2, said third connection means 13C are threaded means. According to another non-shown embodiments, said third connection means 13C are connection means by interference or equivalent solutions without this significantly affecting the shape of the cartridge.

In a possible embodiment, said third connection means 13C can comprise a housing seat for a seal gasket, for example an O-ring, for minimizing the risk of fluid leaking at the third connection means.

As shown for example in the sectional view of FIG. 2, the cartridge 1 comprises a passage C1 adapted to place in fluid communication said first interface 11 and said second interface 12 in order to allow the flow of said fluid. Specifically, the passage C1 defines a path obtained in the main body 10 of the cartridge 1 that connects said first interface 11 and said second interface 12 for placing them in fluid communication to each other and allowing the fluid flow between them.

The passage C1 develops in said main body 10 substantially along a first direction X1. In the embodiment shown in the attached figures, said first direction X1 coincides with a first main axis of the cartridge 1, for example a longitudinal development axis of the cartridge. In detail, the passage C1 longitudinally traverses said main body 10 in a substantially parallel manner to the first direction X1 from the first base surface 10D to the second base surface 10U.

The cartridge 1 comprises an internal chamber C2 that results to be traversed by said passage C1, i.e. said passage C1 is passing through said internal chamber C2. As shown in the attached figures, said internal chamber C2 is in fluid communication with said third interface 13. Specifically, said internal chamber C2 develops in said main body 10 starting from said third interface 13 along the second direction X2. In other words, said internal chamber C2 appears as a cavity obtained in said main body 10 starting from the third interface 13 and that develops in the main body 10 along the second direction X2. In the shown embodiment, the internal chamber C2 has a substantially cylindrical shape with substantially circular section in a plan orthogonal to said second direction X2. This embodiment is to be intended in an exemplificative and non-limiting manner, because the internal chamber C2 can take other shapes.

It should be noted that said passage C1 and said internal chamber C2 are in fluid communication. Specifically, the passage C1 is open on said internal chamber C2, and constitutes at least part of said internal chamber. Then, the passage C1 does not appear as a duct having walls that separate it from said internal chamber C2, but constitutes part of the internal chamber itself. This aspect clearly results from the attached figures.

Figures 15, 16:
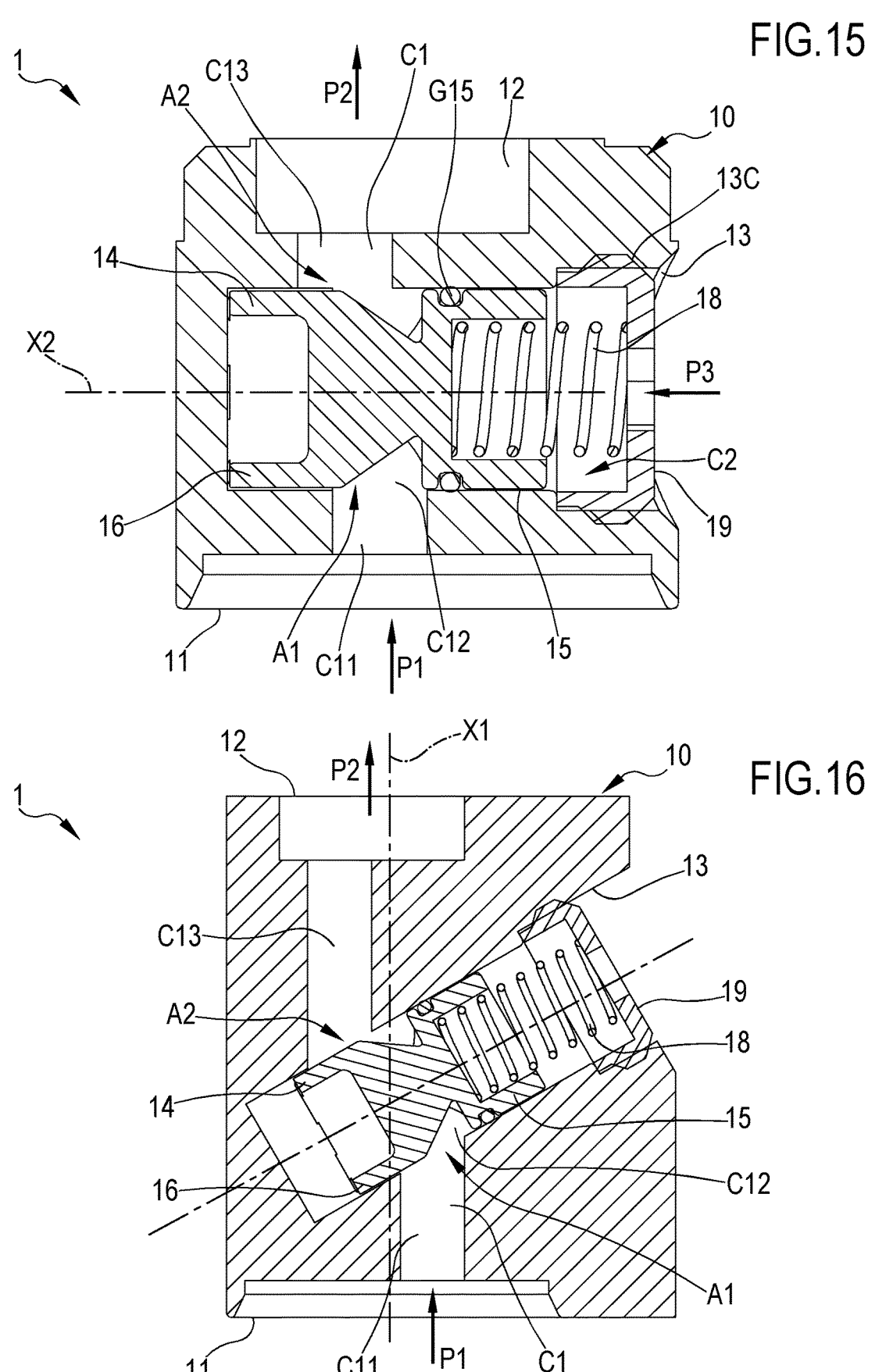
FIG. 15 shows, by means of a sectional view, another embodiment of the cartridge for dynamic reduction of the pressure according to the present invention.
FIG. 16 shows, by means of a sectional view, yet another embodiment of the cartridge for dynamic reduction of the pressure according to the present invention.

As shown, said second direction X2 is not parallel to said first direction X1. Preferably, said second direction X2 forms with said first direction X1 an angle comprised between 30° and 150°, even more preferably comprised between 60° and 120°. In the shown embodiment, said second direction X2 forms with said first direction X1 an angle of 90°, i.e. said first direction X1 and said second direction X2 are orthogonal to each other. In the embodiments of FIGS. 1-13 and 15, said first direction X1 and said second direction X2 are orthogonal to each other. In the embodiment of FIG. 16, said first direction X1 and said second direction X2 form between them an angle substantially equal to 45°.

The cartridge 1 comprises a shutter 14 shown in detail in FIGS. 3A-3C separated from other components of the cartridge. Said shutter 14 is movably housed in said internal chamber C2. Specifically, said shutter 14 is configured for separating said third interface 13 from said passage C1. In other words, with the cartridge 1 mounted, the passage C1 and the third interface 13 are not in fluid communication and, then, the fluid at the third pressure P3 entering to the third interface 13 does not flow in the passage C1 because of the presence of the shutter 14 and, analogously, the fluid at the first pressure P1 or second pressure P2 circulating inside the passage C1 does not reach the third interface 13.

As shown in detail in FIGS. 4A-4C and FIG. 10, the shutter 14 is active on said passage C1, i.e. said shutter 14 is operatively associated to said passage C1. In particular, said shutter 14 is active on said passage C1 in order to interfere with said passage. More specifically, said shutter 14 is active on said passage to obstruct it at least partially in a selective and variable manner and to apply a reduction factor between said first pressure P1 and said second pressure P2. Then, the shutter 14 is configured for obstructing the fluid flow from the first interface 11 to the second interface 12 and applying, according to the obstruction grade, an opportune reduction ratio in order to bring the pressure value of the fluid entering the cartridge (first pressure P1) to a lower or equal value to bring entering the valve body (second pressure P2).

In particular, the shutter 14 interferes with said passage C1 for causing a shrinkage of in at least one position of the passage C1 through which the fluid transits from the first interface 11 to the second interface 12. Contextually, then, the shutter 14 reduces the pressure of the fluid circulating by applying a reduction factor that depends on the position taken on in the internal chamber C2.

It should be noted that a shrinkage of the passage useful to the flow of the fluid—therefore a higher interference degree operated by the shutter 14—corresponds to a higher damping effect of the pressure, i.e. to a higher reduction factor between the first pressure P1 and the second pressure P2. Vice versa, an increase of the section of the passage useful to the flow of the fluid—therefore a lower interference degree operated by the shutter 14—corresponds to a lower damping effect of the pressure, i.e. to a lower reduction factor between the first pressure P1 and the second pressure P2.

Figures 4A, 4B, 4C:
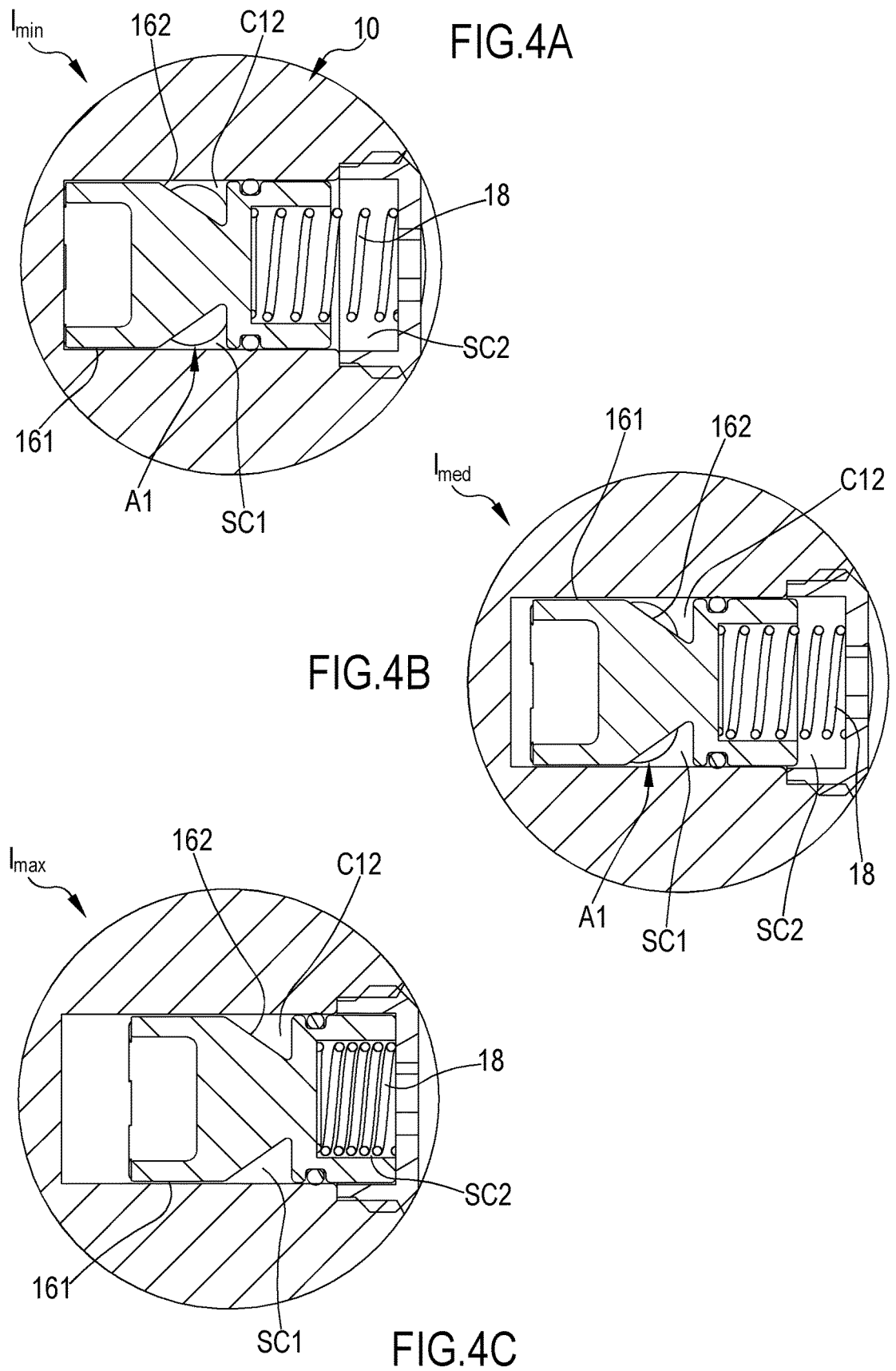
FIGS. 4A-4C show sectional views according to the plane IV-IV of a detail of the cartridge in FIGS. 1A-1E thereof in three different operating shapes.

As shown in FIGS. 4A-4C, said shutter 14 is movable along second direction X2 at least between the following positions:

a minimum interference position Imin, wherein the obstruction of said passage C1 is minimum and the reduction factor between said first pressure P1 and second pressure P2 is minimum;

a maximum interference position Imax, wherein the obstruction of said passage C1 is maximum and the reduction factor between said first pressure P1 and second pressure P2 is maximum;

at least an intermediate position Imed between said minimum interference position Imin and said maximum interference position Imax, wherein reduction factor takes on an intermediate value between said minimum value and maximum value.

Preferably, said shutter 14 is mobile seamlessly between said minimum interference position Imin and said maximum interference position Imax, i.e. said shutter 14 can take on any intermediate position between said minimum interference Imin and maximum interference position Imax. In other words, said shutter 14 can take on a continuous infinity of intermediate positions between said minimum interference position Imin and maximum interference position Imax.

Specifically, the position of said shutter 14 is determined by said first pressure P1 and said third pressure P3. More in particular, the position taken on by the shutter is conjointly depending on said first pressure P1 and said third pressure P3. Then, the obstruction degree of the passage C1 operated by the shutter 14 is simultaneously determined by the values taken on by the first pressure P1 of the fluid entering the cartridge 1 and the third pressure P3 of the fluid exiting the valve body 2.

Preferably, the position of said shutter 14 is determined by a comparison between said first pressure P1 and said third pressure P3. More preferably, the position of said shutter 14 is determined by a difference between said first pressure P1 and said third pressure P3. The governing principles of the movement of the shutter 14 will be clearer hereinafter in the present description with the introduction of other aspects of the interested cartridge 1.

As shown in FIGS. 3A-3C, said shutter 14 develops around a main extension axis Y. Preferably, said main extension axis Y is the axis along which the shutter 14 mostly develops, i.e. the axis containing the dimension of the main development of the shutter itself. In use, said main extension axis Y is parallel to, or coinciding with, said second movement direction X2 of the shutter. In other words, the shutter 14 moves in said internal chamber C2 along said second direction X2 maintaining the main extension axis Y parallel to, or coinciding with the, movement direction.

In the shown embodiment, said shutter 14 has a symmetric structure with respect to said main extension axis Y, i.e. at each point of the shutter corresponds a respective point of the shutter that is symmetric with respect to said main extension axis. In the shown embodiment, also by virtue of the shape of the internal chamber C2, the shutter 14 has a substantially cylindrical shape, counter-shaped with respect to said internal chamber, in at least a portion thereof.

It should be noted that the whole structure of the cartridge 1 is substantially symmetric. This property allows the cartridge 1 to work also in a reverse or overturned configuration, i.e. with the fluid entering the second interface 12 and exiting the first interface 11. The nomenclature used in the present description is purely conventional and both the interfaces placed on the sides of the passage C1 can be used as inlet interface or outlet interface according to the needs and components connected to them.

As clearer shown in FIGS. 3A-3C, the shutter 14 comprises a support portion 15 and an interference portion 16. On the one hand, said support portion 15 is configured for housing movably along said second direction X2 said shutter 14 in said internal chamber C2. On the other hand, said interference portion 16 is active on said passage C1 in order to at least partially obstruct it in a selective and variable manner. In this perspective, the shutter 14 comprises at least two main portions: the support portion 15, configured for maintaining the connection of the shutter 14 to the main body 10 and allowing the housing thereof in movable manner at said internal chamber C2, and the interference portion 16, adapted to obstruct the passage C1 between the first interface 11 and the second interface 12 in a selective and variable manner according to the position taken on by the shutter 14 itself in order to adapt the reduction ratio between the first pressure P1 and the second pressure P2.

As shown, said support portion 15 and said interference portion 16 are positioned at opposite ends of the shutter 14 along its main extension axis Y. More in particular, said support portion 15 and said interference portion 16 are integral with each other, i.e. are connected without possibility of relative movement.

Said support portion 15 is sealed with said internal chamber C2, i.e. an external surface of said support portion 15 adheres to the internal walls of the internal chamber C2. In the shown embodiment, the support portion 15 has a substantially cylindrical shape which follows the shape of the internal chamber C2. Preferably, said support portion 15 comprises a seat 151 for housing a seal gasket G15. Said seal gasket G15 is configured for avoiding the leakage of fluid between the lateral wall of the internal chamber C2 and the external surface of the support portion 15. In this sense, the seal between said support portion 15 and the internal chamber C2 contributes to the interruption of the fluid connection between said passage C1 and said third interface 13. The support portion 15 comprises a dividing wall 17. Preferably, as shown for example in FIG. 3B, the dividing wall 17 is connected to the interference portion 16, i.e. represents the point wherein the interference portion 16 contacts the support portion 15.

Specifically, said dividing wall 17 divides said internal chamber C2 in a first sub-chamber SC1 and a second sub-chamber SC2. Specifically, said dividing wall 17 is configured for plugging said internal chamber C2, by interrupting, in combination with the seal between the support portion 15 and the lateral wall of the internal chamber, the fluid communication between said passage C1 and said third interface 13. In fact, said support portion 15 is configured for avoiding a fluid communication between said first sub-chamber SC1 and second sub-chamber SC2, and consequently between said passage C1 and said third interface 13.

By virtue of the separation operated by the dividing wall 17, said first sub-chamber SC1 contains said interference portion 16 and contains at least partially the passage C1, i.e. the passage C1 is at least partially defined in said first sub-chamber SC1. The second sub-chamber SC2 is in fluid communication with said third interface 13. In particular, said second sub-chamber SC2 is in continuity with said third interface 13.

Preferably, as shown in FIG. 3B, said dividing wall 17 has a mainly plane development. Even more preferably, said dividing wall 17 develops in a direction substantially orthogonal to the main extension axis Y of said shutter 14.

In the shown embodiment, said dividing wall 17 comprises a first side 171 directed, in use, towards the first sub-chamber SC1 and configured for being affected by said fluid at the first pressure P1. Analogously, the dividing wall 17 comprises a second side 172, opposite to said first side and directed, in use, towards the second sub-chamber SC2 in order to be affected by said fluid at the third pressure P3. In this sense, being affected on the opposite sides thereof both by the fluid at the first pressure P1 and by the fluid at the third pressure P3, the dividing wall determines the position taken on by the shutter 14. The fluids at the two pressures simultaneously press, with the same direction but opposite senses, on the dividing wall 17 and cause the movement of the whole shutter 14. In principle, in absence of other elements placed as obstacle of the movement of the shutter 14, when the first pressure P1 is higher than the third pressure P3, the dividing wall 17 undergoes a force that places it near the third interface 13. Vice versa, when the third pressure P3 is higher than the first pressure P1, the dividing wall undergoes a force that moves away from the third interface.

Specifically, the maximum interference position Imax of the shutter 14 corresponds to a position of maximum proximity of the dividing wall 17 to the third interface 13. This position corresponds to a situation wherein the first pressure P1 is too high relative to the third pressure P3, then it is necessary the maximum level of interference and, thus, of reduction of the pressure (maximum value of the reduction ratio).

On the contrary, the minimum interference position Imin of the shutter 14 corresponds to a position of maximum distance of the dividing wall 17 from the third interface 13. This position corresponds to a situation wherein the first pressure P1 is insufficient relative to the third pressure P3, then it is necessary the minimum level of interference and, then, of reduction of the pressure (minimum value of the reduction ratio).

As shown for example in FIG. 3C, said interference portion 16 comprises an obstructing sector 161 and a transition sector 162. The obstructing sector 161 is configured for operating a greater interference with said passage C1 with respect to said transition sector 162. Thus, the obstructing sector 161 is adapted to operate a localized shrinkage of the passage C1 higher with respect to the one operated by the transition sector 162. As shown in FIGS. 3A-3C, said transition sector 162 is a sector of the interference portion 16 proximal with respect to the support portion 15 along said main extension axis Y. On the contrary, said obstructing sector 161 is a distal sector with respect to the support portion 15 along said main extension axis Y. More in particular, said transition sector 162 is interposed between said obstructing sector 161 and said dividing wall 17 along said main extension axis Y.

As shown in detail in FIG. 3C, said transition sector 162 has a tapered shape having increasing section along the main extension axis Y in a direction approaching said obstructing sector 161 or, equivalently, in a direction away from said dividing wall 17. Specifically, the section of said transition portion 162 in a plane orthogonal to said main extension axis Y increases with the proximity to the obstructing sector 161 and decreases with the proximity to the dividing wall 17.

In the shown embodiment it is possible to identify the presence of three different sections of the passage C1. In detail, said passage C1 comprises:

a first section C11 developing between said first interface 11 and said internal chamber C2;

a second section C12 developing in said internal chamber C2 and defined by said internal chamber C2 and said shutter 14;

a third section C13 developing between said internal chamber C2 and said second interface 12.

Said first section C11, second section C12 and third section C13 appear as three consecutive parts composing said passage C1 in the main body 10 between the first interface 11 and the second interface 12.

The first section C11 comprises a first opening A1 facing said internal chamber C2. In this sense, the first section C11 is configured for placing in fluid communication said first interface 11 and said internal chamber C2 for bringing the fluid at the first pressure P1 to the internal chamber C2 through said first opening A1. In particular, said second section C12 is in fluid communication with said first section C11 at said first opening A1.

The third section C13 of the passage comprises a second opening A2 facing said internal chamber C2. In a way substantially analogous to the first section C11, the third section C13 is configured for placing in fluid communication said internal chamber C2 and said second interface 12 for bringing the fluid at the second pressure P2 to the second interface 12 so that said fluid can be then sent to the valve body 2. The third section C13 is in fluid communication with said second section C12 at said second opening A2.

It should be noted that said first section C11 and said third section C13 have fixed shape and position. In the shown embodiment, said first section C11 and third section C13 take on the shape of ducts obtained in said main body 10 and are then non-deformable. In the embodiment shown in FIGS. 1-13 and more in detail in FIG. 2, said first section C11 and third section C13 are aligned along said first direction X1. In other embodiments, shown for example in FIGS. 15 and 16, said first section C11 and third section C13 are not aligned between them, even developing preferably in a way parallel to the first direction X1.

The second section C12 is defined by said internal chamber C2 and said shutter 14. Specifically, said second section C12 is defined by the walls of said internal chamber C2, by said dividing wall 17 and by said interference portion 16. More in detail, the second passage C12 is constituted by the portion of first sub-chamber SC1 comprised between said dividing wall 17 and said obstructing sector 161 and left free from said interference sector 162.

Consequently, being defined at least in part by said shutter 14, said second section C12 varies according to the position taken on by the shutter itself. More in particular, said second section C12 is configured for translating along said second direction X2 according to the position taken on by said shutter 14 as shown in the three views of FIGS. 4A-4C and of the synoptic view of FIG. 10.

As shown in FIGS. 4B and 4C, said shutter 14 is configured for obstructing at least partially said first opening A1 and/or said second opening A2 at least when it is in said maximum interference position Imax and said at least one intermediate position Imed. In particular, the obstruction degree of said first opening A1 and/or said second opening A2 operated by said shutter 14 is function of the position taken on by the shutter itself. In the shown embodiment, said shutter 14 is configured for obstructing at least partially said first opening A1 and said second opening A2 in a simultaneous manner, when they are aligned along said first direction X1. In the embodiments of FIGS. 15 and 16, said first opening A1 and said second opening A2 are not aligned between them, but the shape and/or the orientation of the shutter 14 is such as to obstruct both in simultaneous manner, eventually with a different interference degree of the shape of passage C1 and, more in particular, of the arrangement and/or orientation of said first, second and third section C11, C12 and C13.

It is here better defined, with reference to the embodiment of FIGS. 4A-4C, the function of the obstructing sector 161 and of the transition sector 162.

On one hand, the obstructing sector 161 is configured for substantially obstructing said first opening A1 and said second opening A2. According to the position taken on by the shutter 14, the obstructing sector 161 affects a variable portion of said first and second opening, by varying the obstruction degree operated. Said obstructing sector 161 represents a part of the interference portion 16 maximumly near the walls of the internal chamber C2. Then, when the position of the shutter 14 is such that said obstructing sector 161 interferes at least partially with said first opening A1 and said second opening A2, they result at least in part substantially plugged. It should be noted that, according to the present invention, the terms "substantially obstructing" and "substantially plugged" do not exclude the possibility of a leakage of fluid between the external surface of the obstructing sector 161 and the walls of the internal chamber C2. Then, it is not necessary that the obstructing sector strikes against the walls of the internal chamber C2.

On the other hand, the transition sector 162 is spaced from the walls of the internal chamber C2. Independently from the shape taken on, the transition sector 162 does not strike against the walls of the internal chamber C2 and defines the second section C12 of the passage C2. Then, when the position of the shutter 14 is such that said transition sector 162 interferes at least partially with said first opening A1 and said second opening A2, they result at least in part substantially free.

FIGS. 4A-4C show the following position:
FIG. 4A: shutter in minimum interference position;
FIG. 4B: shutter in intermediate position;
FIG. 4C: shutter in maximum interference position.

These figures are sectional views according to a plane orthogonal to the first direction X1 and containing said second direction X2, then show only one between said first opening A1 and second opening A2, specifically the first opening A1. However, being the shutter 14 symmetric and being said first opening A1 and second opening A2 aligned along the first direction X1, what is shown in relation to the first opening A1 applies also to the second opening A2. It should be noted, however, that what is said hereinafter with respect to the embodiment of FIGS. 4A-4B applies, with the due differences, also to the embodiments of FIGS. 15 and 16 wherein said first opening A1 and second opening A2 are not aligned.

In the minimum interference position Imin of FIG. 4A, said first opening A1 is almost totally affected by the transition sector 162. Said first opening A1 results, then, substantially free for its whole extension. Consequently, the reduction factor of the pressure applied by the cartridge 1 is minimum.

In the intermediate position Imed of FIG. 4B, the first opening A1 is partially affected by said obstructing sector 161 and partially affected by said transition sector 162. Then, the obstructing sector 161 plugs said first opening A1 only partially, whereas the remaining part is maintained free by the transition sector 162. Said first opening A1 results, then, neither completely free nor completely plugged. Consequently, the reduction factor of the pressure applied by the cartridge 1 is intermediate.

In the maximum interference position Imax of FIG. 4C, said obstructing sector 161 obstructs said first opening A1 in a substantially total manner. Said first opening A1 results, then, substantially plugged. Consequently, the reduction factor of the pressure applied by the cartridge 1 is maximum.

It should be noted that also in the maximum interference position Imax there can be a leakage of fluid between the external surface of the obstructing sector 161 and the walls of the internal chamber C2; in particular this leakage is such as to maintain the flow rate as much as possible constant with the variation of the pressure P1. Generally, in each of the positions taken on by the shutter the purpose is to maintain as much as possible constant the flow rate adjusted by the valve body placed downwards of the cartridge; what varies—with the variation of the position of the shutter—is the fall of the pressure applied by the cartridge, whereas flow rate selected downwards remains substantially unchanged.

Preferably, as shown in detail in FIGS. 3A-3C, said obstructing sector 161 has at least a groove 161' at an external surface thereof. Said at least a groove 161' is configured for preventing that said obstructing sector 161 obstructs completely, i.e. plugs, said passage C1 when said shutter 14 is in said maximum interference position Imax. As shown, said at least a groove 161' consists in a recess that develops on the whole external surface of said obstructing sector 161. In particular, said groove 161' is in fluid communication with said first interface 11 and said second interface 12 and defines at least partially said passage C1.

The cartridge 1 comprises a return element 18, operatively associated to said shutter 14. Specifically, said return element 18 is configured for hindering the movement of said shutter 14 towards the maximum interference position Imax and maintaining it in said minimum interference position in the absence of fluid flow or when the first pressure P1 is lower than a determined threshold. In fact, the return element 18 operates an action additional to the one of the third pressure P3 and promotes the return of the shutter 14 in the minimum interference position Imin and the maintenance of this position when the first pressure P1 is not sufficiently high relative to the third pressure P3. In fact, if the first and the third pressure have substantially the same value, the shutter 14 would not be subjected to any force and would result inert. The action of the return element 18 allows to return the shutter in the minimum interference position Imin because no reduction of the pressure is necessary. The shutter 14 maintains the minimum interference position Imin with a determined inertia until the first pressure P1 does not increase relative to the third pressure P3 in a sufficient manner to win the resistance of the return element 18 and of the third pressure P3. The shutter is then moved towards the maximum interference position Imax because there is the need to reduce the second pressure P2 by applying a higher reduction factor on the first pressure P1.

The cartridge 1 comprises furthermore an abutment element 19 for said return element 18. Preferably, said abutment element 19 is positioned at said third interface 13, in particular at the opening of said third interface 13 on the external surface of said main body. Specifically, said return element 18 insists between said shutter 14, preferably at said second side 172 of the dividing wall 17, at a first end and said abutment element 19 at a second end.

In the embodiment shown in the attached figures, said return element 18 is a spring, in particular a compression spring. When said shutter 14 is in the minimum interference position Imin (FIG. 4A), the return element 18 is in a rest (neither compressed nor extended spring) or preloading condition (wherein the return force takes on minimum value). On the contrary, when said shutter 14 is in the maximum interference position Imax or in the intermediate position Imed, the return element 18 is in a compression or extension condition (in the embodiment of FIGS. 4B and 4C the spring is compressed). In this manner, in the maximum interference position Imax or in the at least an intermediate position Imed, the return element 18 exerts, in addition to the third pressure P3, a force such as to push the shutter 14 in the minimum interference position Imin. If the first pressure P1 is not sufficient to withstand this return action, the shutter 14 is moved towards the minimum interference position Imin.

In the shown embodiment wherein the return element 18 takes on the shape of a spring, the elastic constant of the spring itself can be set during the design step of the cartridge for adjusting the resistance opposite to the compression and the relative return action. The higher the resistance to the contraction is, the lower is the contraction of the return element in comparison with the first pressure P1 and the third pressure P3 themselves and then the lower is the reduction factor between the first pressure P1 and the second pressure P2. In this manner it is determined also the minimum threshold of the first pressure P1 sufficient to move said shutter.

In the embodiment of the attached figures, the abutment element 19 is a perforated cap, i.e. a cap showing at least a passing hole adapted to allow the inlet of the fluid at the third pressure P3 in the internal chamber C2, more precisely in the second sub-chamber SC2. In particular, said perforated cap is positioned at said third interface 13, preferably at the opening of the third interface on the external surface of said main body 10. In other words, said perforated cap is positioned substantially flush with the external surface of the main body. As shown in FIG. 2, the abutment element 19 is connected to said third interface at said third connection means 13C.

Figure 8:
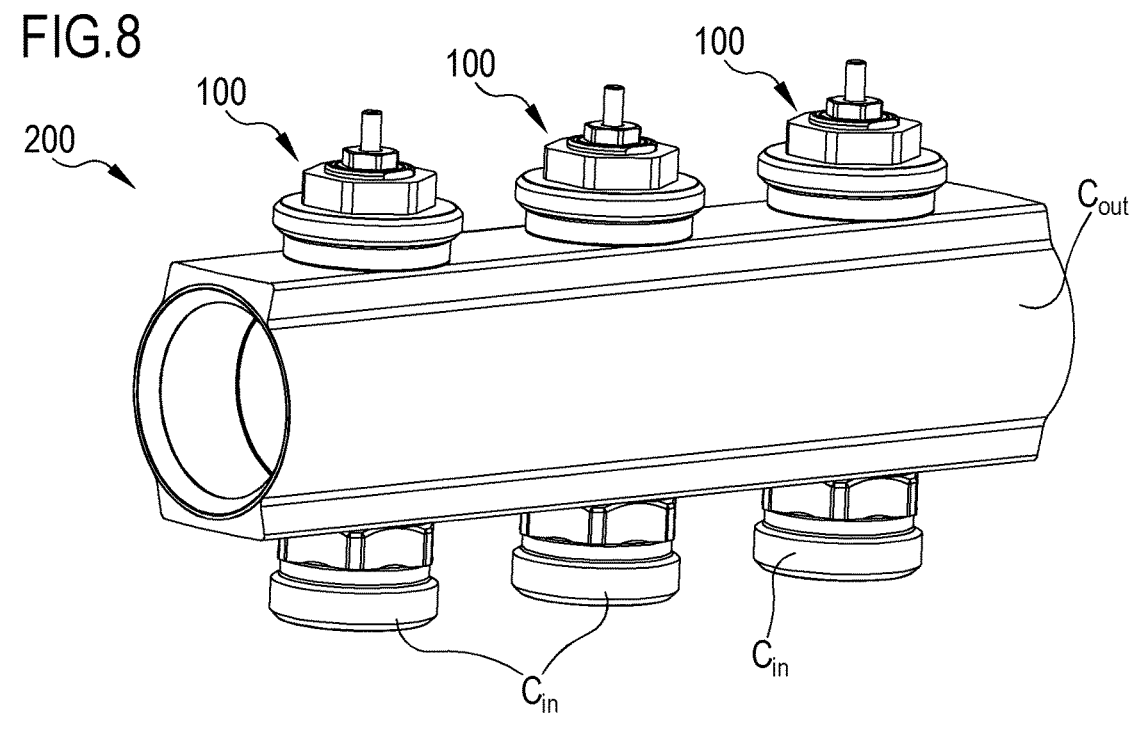
FIG. 8 is a perspective view of a distributing system of a fluid comprising three devices for treating a fluid according to the present invention.
Figure 9:
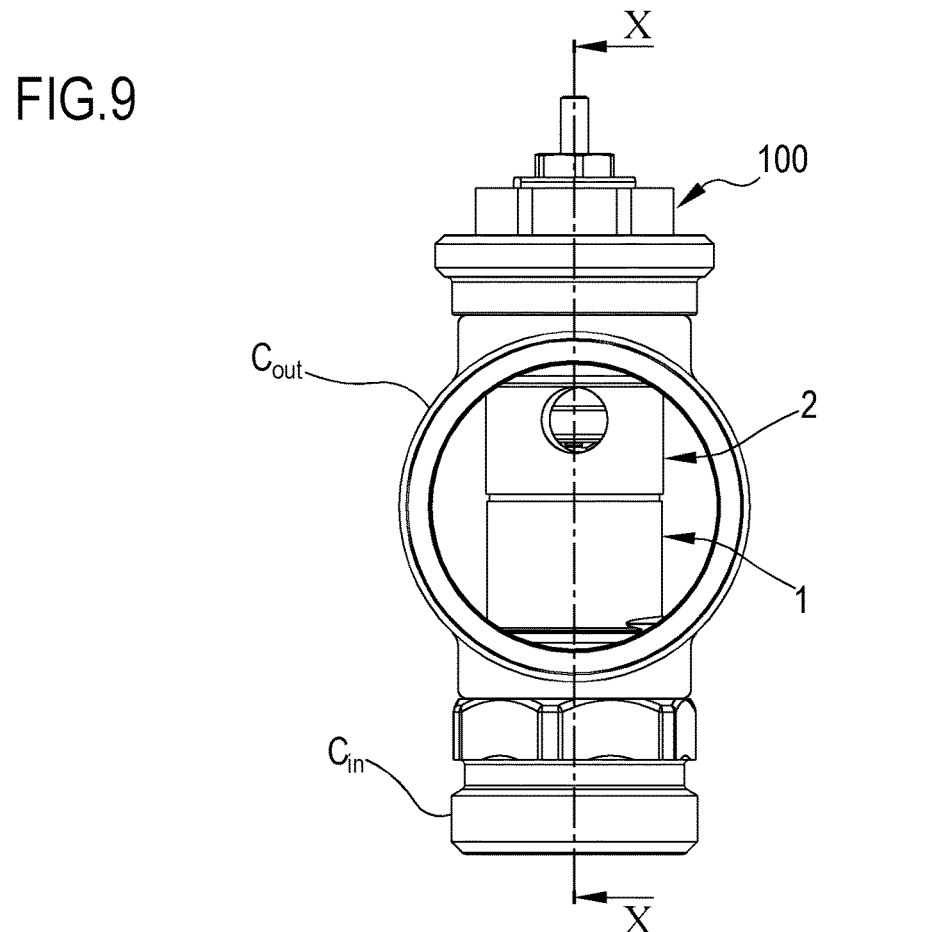
FIG. 9 is a lateral view of the distributing system in FIG. 8 thereof.
Figure 10:
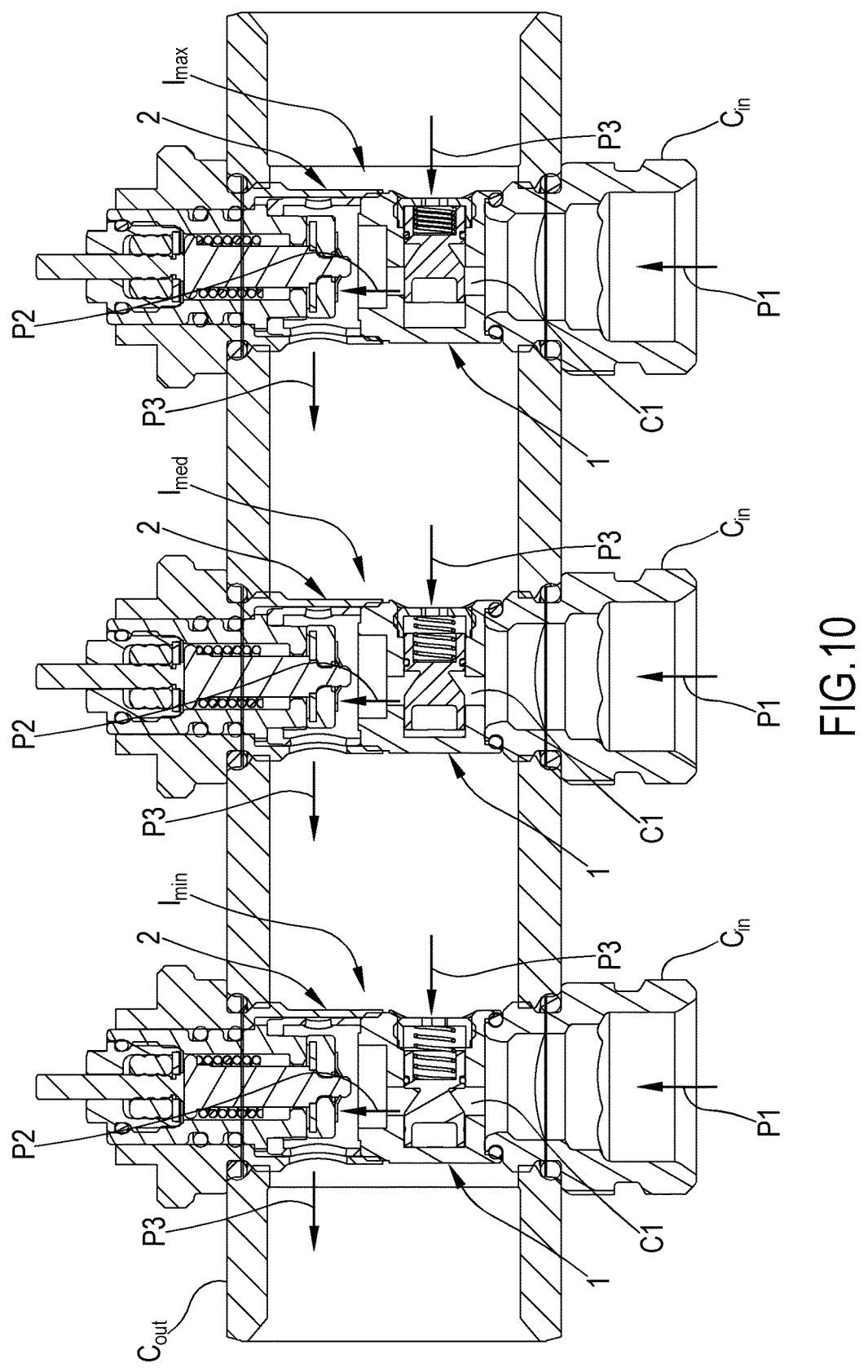
FIG. 10 is a sectional view according to the plane X-X of the distributing system of FIGS. 8 and 9.
Figure 12:
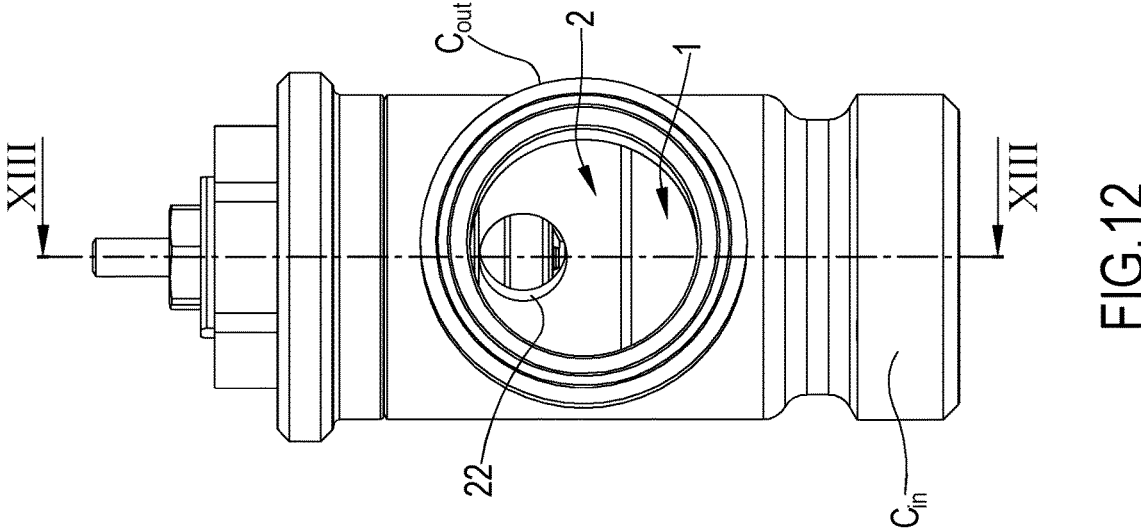
FIG. 12 is a lateral view of the valve of FIG. 11.
Figure 11:
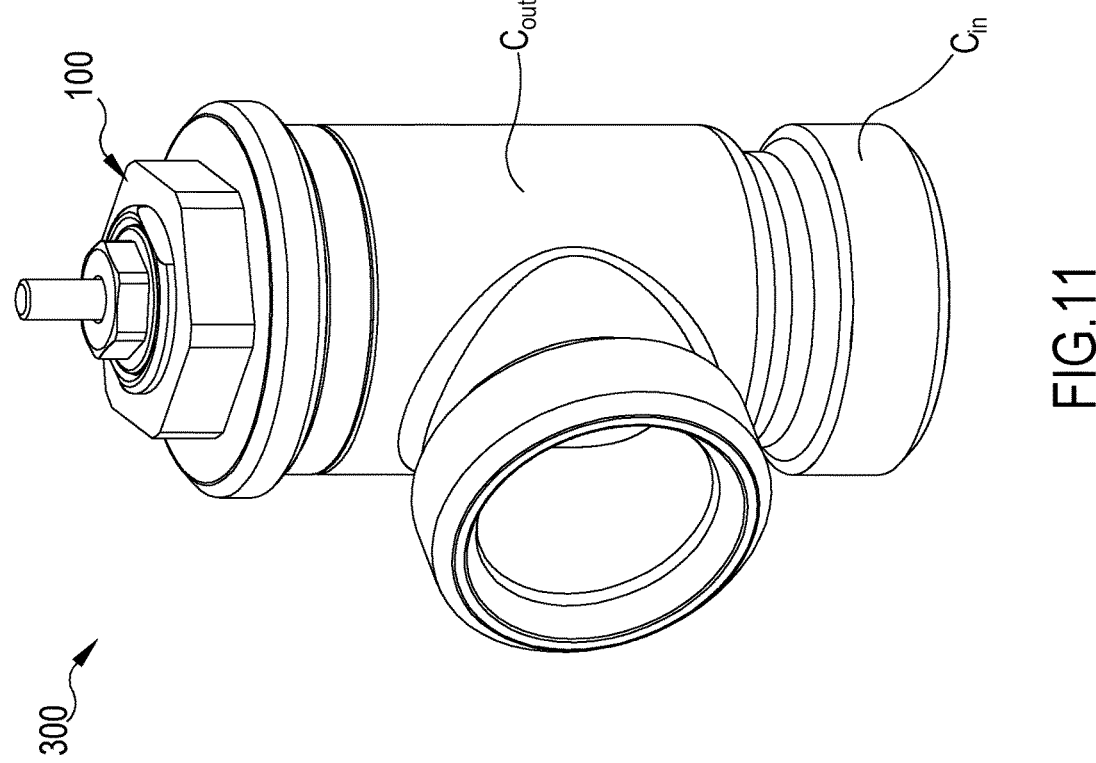
FIG. 11 is a perspective view of a distributing valve of a fluid comprising a device for treating a fluid according to the present invention.
Figure 13:
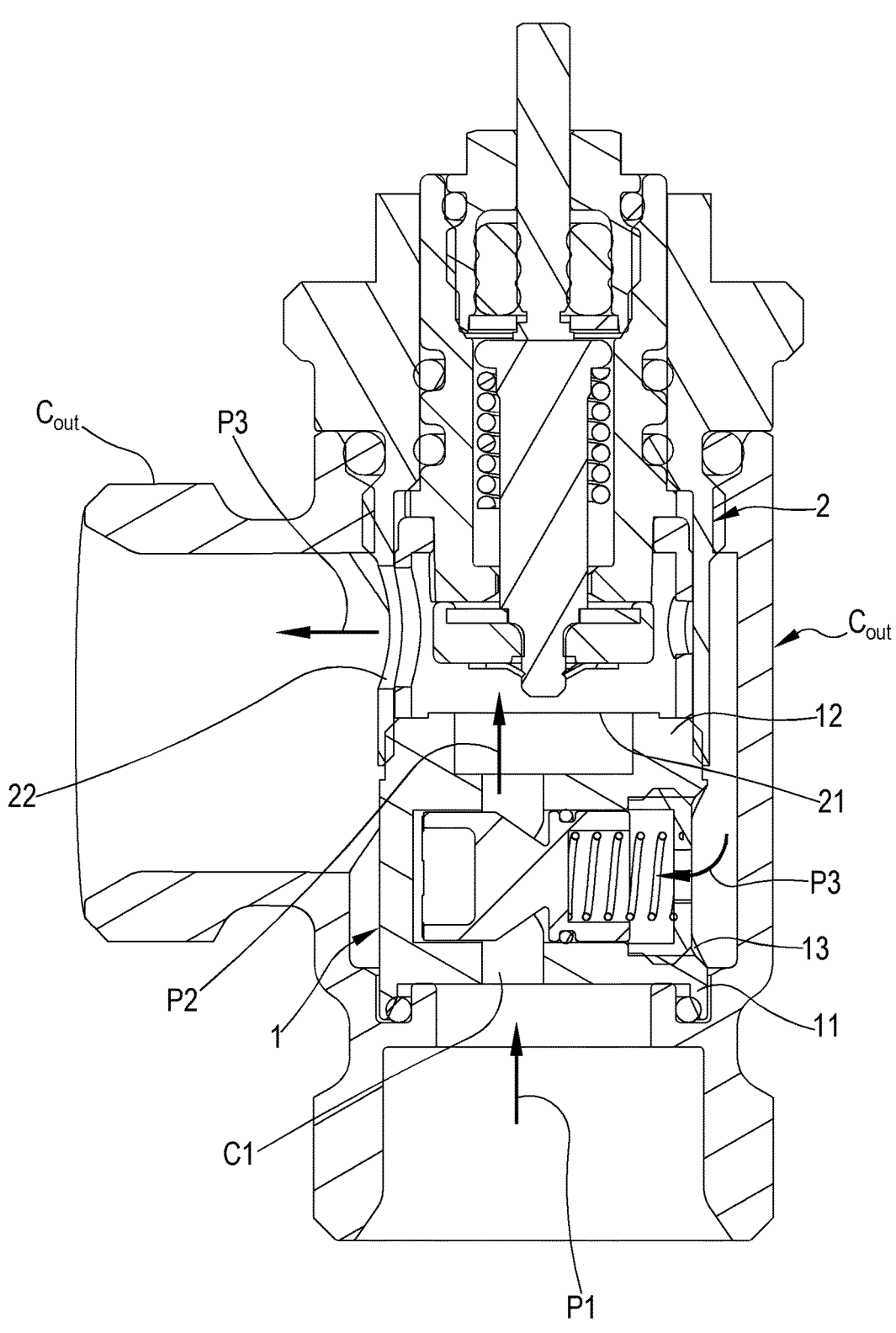
FIG. 13 is a sectional view according to the plane XIII-XIII of the valve of FIGS. 8 and 9.

The present description has as its object also a device 100 for treating a fluid. An exemplificative and non-limiting embodiment is shown in FIGS. 5A-5C in the assembled shape thereof and in FIGS. 6 and 7 in an exploded shape. Furthermore, FIGS. 8-10 show a first application of the device 100 referring to a collector 200 within which are installed three devices 100. FIGS. 11-13 show a second application of the device 100 in the context of an independent two-way valve 300, for example a thermostatic value applicable to a radiator.

As shown, the device 100 comprises the cartridge 1 for dynamic reduction of the pressure of a fluid previously described.

The device 100 is connectable to an inlet duct Cin. Said inlet duct Cin is connected to said first interface 11 of the cartridge 1 and is configured for sending to said cartridge 1 the fluid at the first pressure P1. This fluid at the first pressure P1 enters in said cartridge and is subjected to a pressure reduction from a value equal to the first pressure P1 to a value equal to the second pressure P2, the latter, as previously determined, being lower than or equal to the value of the first pressure P1. As already described, the reduction factor between the first pressure P1 and the second pressure P2 is determined by the position taken on by the shutter 14 with respect to the passage C1. In the embodiment shown in the attached figures, said inlet duct Cin is a duct of a hydraulic plant.

The device 100 comprises a valve body 2 configured for carrying out a treatment of a fluid. Said valve body 2 results in fluid communication with the second interface 12 of the cartridge 1 in order to receive said fluid at the second pressure P2, i.e. the fluid at the pressure reduced by the cartridge. Specifically, the valve body 2 is configured at least for bringing said fluid to a third pressure P3. According to the application of the device 100 and/or to the operating conditions of the valve body 2, said third pressure P3 can be different from said second pressure P2, preferably lower, or can be substantially equal to said second pressure P2.

According to what is shown in FIG. 5C, the valve body 2 comprises an inlet opening 21. Said inlet opening 21 is in fluid communication with said second interface 12 in order to receive said fluid at the second pressure P2. As shown still in FIG. 5C, the valve body 2 comprises an outlet opening 22 for the outflow of said fluid at the third pressure P3 from said valve body. As it will be clearer hereinafter, said outlet opening 22 faces an outlet duct Cout. Thus, the fluid, after having undergone said treatment and having been brought to the third pressure P3, is expelled from said valve body 2 through said outlet opening 22.

The device 100 is furthermore configured for placing in fluid communication said outlet opening 22 of the valve body 2 with said third interface 13 of the cartridge 1 to send to said cartridge the fluid at the third pressure P3. In this way, there is a retroaction mechanism, already previously shown, that provides for adjusting the reduction factor applied by the cartridge 1 according to the first pressure P1 entering the cartridge and to the third pressure P3 outflowing from the valve body.

Preferably, said valve body 2 comprises means for controlling the flow 23. As shown in FIG. 5C, means for controlling the flow 23 result interposed between said inlet opening 21 and said outlet opening 22. In particular, said means for controlling the flow 23 are configurable to adjust in a selective manner the flow of the fluid outflowing from said valve body 2 through said outlet opening 22.

In the shown embodiments, said means for controlling the flow 23 comprise a ring 231, shown more in detail in the exploded view of FIGS. 6 and 7. Said ring 231 comprising a plurality of openings 232 having different section for controlling the flow. Specifically, said plurality of openings 232 are each one configured for being positioned at said outlet opening 22 for adjusting the flow of the fluid outflowing from the valve body. In other words, according to the position taken on by the ring 231, one of the control openings 232 is selectively positioned at the outlet opening 22 for matching with it and allowing the fluid to flow in said outlet duct Cout. The section of each opening 232 determines the flow rate of the fluid exiting from said valve body through said outlet opening 22.

In the shown embodiment, said device 100 comprises adjustment means 24 of said means for controlling the flow 23. Said adjustment means 24 are, then, operatively associated to said means for controlling the flow 23 and, specifically, are configured for moving at least said ring 231. Said adjustment means 23 are configured for selectively positioning an opening of said plurality of openings 232 at said outlet opening 22, so that it matches at least partially with the section of the outlet opening and determines the maximum flow rate exiting from said valve body 2. In the shown embodiment, said adjustment means 23 are manually operable, preferably by means of the use of an opportune tool.

More in detail, in the shown embodiment, said valve body 2 is a thermostatic valve. Said thermostatic valve is of substantially known type and will not then be described in detail in the present document.

Preferably, said means for controlling the flow 23 comprise a second shutter 233. Said second shutter 233 is interposed between said inlet opening 21 and said ring 231. In particular, said second shutter 233 is connected to a control stem 234 actuatable, externally to said valve body 2, by further control means for varying a section of the passage of the fluid in the valve body. In other words, said further control means are connectible to said thermostatic valve 2 to operate said stem 234 and, then, to move said second shutter 233. In this way it is modified the internal section of the valve body for the passage of the fluid.

Always preferably, said further control means comprise a thermostatic head associable with said thermostatic valve, not shown in the attached figures for clarity reasons. Said thermostatic head is of known type too and then not described in detail in the present document.

As previously anticipated, the device 100 is connectible to an outlet duct Cout. Said outlet duct Cout is in fluid communication with said valve body 2 to receive said fluid at the third pressure P3 outflown by means of said outlet opening 22. In other words, the outlet duct Cout is a duct wherein said valve body 2 discharges, through said outlet opening, the fluid treated and brought to the third pressure P3.

The outlet duct Cout is in fluid communication also with said third interface 13 of the cartridge 1. In particular, said outlet duct Cout is configured for sending to said cartridge 1, more precisely to the third interface 13, the fluid at the third pressure P3.

Typically, said outlet duct is then connected to other elements of a hydraulic plant, not shown and that will not be described in the present document because they fall outside of the context of the device 100.

In FIGS. 8-13 are shown two different applications of the device 100:

collector 200 (FIGS. 8-10) with three devices 100 installed and a single outlet duct Cout common to all the three devices 100 present;

two-way valve 300 with a single device 100 installed in the case of the valve itself.

Both in the application with the collector 200 and in the application with the two-way valve 300, the third interface 13 of the cartridge 1—or of the cartridges 1 in the context of the collector 200—is directly facing said outlet duct Cout in order to receive the fluid at the third pressure P3. According to this embodiment, then, said cartridge 1 and said outlet duct Cout are in direct fluid communication, i.e. without the interposition of further elements.

Then, the fluid at the third pressure P3 circulating in said outlet duct Cout directly enters in said third interface 13 through the relative opening, which is directly facing the inner of said outlet duct.

According to another non-shown embodiment, said device 100 comprises a control duct connected to said outlet duct Cout and to said third interface 13 in order to place them in fluid communication between them. In this embodiment, the outlet duct Cout and the cartridge 1 are in indirect fluid communication, i.e. by means of the interposition of other elements, such as, precisely, the control duct. This control duct is then configured for sending to said third interface 13 the fluid at the third pressure circulating in said outlet duct Cout. This embodiment allows the cartridge 1 and the valve body 2 to be placed at a distance the one from the other, i.e. not in direct contact.

In the shown embodiment, said cartridge 1 and said valve body 2 are directly connected. Specifically, said cartridge 1 and said valve body 2 are directly connected at said second interface 12 through the second connection means 12C. According to said embodiment, then, said cartridge 1 and said valve body 2 are in direct fluid communication, i.e. without the interposition of further elements. Then, the fluid at the second pressure P2 exiting from said second interface 12 directly enters in said inlet opening 21 of the valve body 2.

In another non-shown embodiment, said device 100 comprises an intermediate duct interposed between said cartridge 1 and said valve body 2. According to this embodiment, said intermediate duct has an end connected to said valve body 2 at the inlet opening 21 and an end opposite connected to said second interface 12 at said second connection means 12C. In this embodiment, the valve body and the cartridge are in indirect fluid communication, i.e. by means of the interposition of further elements, such as, precisely, the intermediate duct. The intermediate duct is then configured for allowing the flow of the fluid at the second pressure P2 from the second interface 12 to the inlet opening 21.

It is also object of the present description, a mounting method M of the device 100 previously described. Said mounting method M comprises at least the following steps:

arranging M1 a main body 10 comprising:

a first inlet interface 11;

a second outlet interface 12;

a third control third interface 13;

a passage C1 developing in the first direction X1 in order to place in fluid communication said first interface 11 and said second interface 12;

an internal chamber C2 traversed by said passage C1 and in fluid communication with said third interface 13, said internal chamber C2 developing along the second direction X2 not parallel to the first direction X1;

arranging M2 the shutter 14;

mounting M3 the cartridge 1 for dynamic reduction of the pressure movably housing said shutter 14 in said internal chamber C2 in order to at least partially interfere with said passage C1 and to separate said passage C1 from said third interface 13, said shutter 14 being movable along a second direction X2 in order to modify a degree of interference with said passage C1;

associating M4 a valve body 2 to said second interface 12 in order to transmit fluid at the second pressure P2 from said cartridge 1 to said valve body 2.

It should be noted that the aspects of the components involved in the mounting method M have been previously introduced in detail with reference to the cartridge 1 and to the device 100, objects of the present invention too. According to a preferred embodiment, said step of mounting M3 a cartridge 1 provides that said first direction X1 and said second direction X2 form an angle between them comprised between 30° and 150°. Preferably, said angle is comprised between 60° and 30°. Even more preferably, said first direction X1 and said second direction X2 are orthogonal to each other, i.e. said angle is substantially equal to 90°.

Always preferably, said mounting method M comprises one or more of the following steps;

associating M5 an inlet duct Cin to said first interface 11 in order to send said fluid at a first pressure P1 to said cartridge;

associating M6 said valve body 2 to an outlet duct Cout in order send to said outlet duct Cout said fluid at the third pressure P3;

associating M7 said outlet duct Cout to said third interface 13 of the main body 10 in order send to said cartridge 1 said fluid at the third pressure P3;

Said step of associating M4 a valve body 2 to said second interface 12 provides for one of the following solutions:

directly connecting said valve body 2 at the second interface 12;

arranging an intermediate duct interposed between said valve body 2 and said second interface 12 in order to place in fluid communication said valve body and said cartridge.

Always preferably, said step of associating M7 said outlet duct Cout to said third interface 13 provides for one of the following solutions:

directly connecting said third interface 13 to said outlet duct Cout;

arranging a control duct interposed between said outlet duct Cout and said third interface 13 in order to place in fluid communication said outlet duct and cartridge.

Advantages of the Invention

The present invention involves, with respect to the known art, important advantages. First of all, as emerges from the above shown description, the invention allows to overcome the drawbacks of the known art.

In the first place, an advantage of the present invention is to provide a cartridge 1 for dynamic reduction of the pressure adapted to be applied on a valve body 2 and whose damping effect of the pressure is determined by the pressure entering the cartridge 1 and by the pressure exiting from the valve body 2. In this sense, the reduction factor of the pressure applied by the cartridge is upwards and downwards of the whole cartridge-valve body system. This characteristic allows the device according to the present invention to adapt the reduction factor of the inlet pressure according to the whole effect of the cartridge-valve body system. In fact, as previously shown, the known solutions have reduction means of the inlet pressure the behaviour thereof is determined by an only partial analysis of the conditions of the device comprising the valve body associated to the reduction mechanism of the pressure itself. The only partial analysis of the pressure conditions at which the cartridge-valve body system operates, brings to suboptimal functioning intrinsic of an analysis circumscribed to a portion of a control system for the whole system. In fact, the reduction of the inlet pressure affects the whole work of the cartridge-valve body system. On the contrary, in the context of the present invention, the adjustment of the position of the shutter 14, and then the set of the reduction factor, is carried out according to the values of the pressure upwards of the cartridge 1 and downwards of the valve body 2. This promotes an adjustment of the reduction factor of the first pressure P1 that takes into account the effect of the whole system and avoids that the analysis of only a part of the system can bring to suboptimal functioning or even to malfunctioning/failures.

The conjoint analysis of the first pressure P1 upwards of the cartridge 1 and of the third pressure P3 downwards of the valve body 2 allows the whole system to operate in optimal and safe conditions. This approach is global and not limited to a part of the device 100, as the cartridge 1 or the valve body 2. The movement of the shutter 14 ensures that both cartridge 1 and the valve body 2 operate effectively, avoiding conditions typical of known art solutions wherein one or more system components are disregarded as a consequence of an only partial analysis.

Furthermore, the cartridge 1 previously described is equipped with a rational structure, easy to produce and with a particularly easy functioning. In fact, its functioning is based on the relative movement—specifically translation— of non-deformable solid components. The movement of these components is based on easy-to-govern principles and ensures a rapid control of the inlet pressure at the valve body 2. In particular, the strength of the components of the cartridge 1 makes it particularly appreciable for the low propensity to malfunction and failure. With respect to known solutions of the art, wherein deformable elastic components are typically used, in the cartridge 1 according to the invention the components only vary their position relative to each other, without changing their shape. This property makes the cartridge 1 particularly robust with respect to known solutions wherein, as it is well known, elastically deformable components undergo rapid performance degradation processes. Thus, the cartridge 1 is more robust and less prone to failure than existing solutions. Furthermore, a further advantage of the cartridge 1 is its simple construction. In fact, the rational shape of the components of the cartridge 1 ensures a simplified production process and an equally easy mounting process. In particular, the lack of complex elastic elements (with the exception of the return element 18 or the sealing gaskets, per se belonging to the known art) prevents the need to produce diaphragms or elastic membranes that are complex to produce and with laborious installation during the mounting of the cartridge 1.

Another advantage connected to the present invention is to propose a device for treating a fluid that is, in use, particularly quiet. In fact, the pressure reduction treatment carried out by the cartridge 1 allows to avoid the annoying noise component generated by the valve body when the inlet pressure at the valve body 2 is too high. Another important advantage connected to the present invention is to allow an efficient adjustment of the flow rate exiting from the device 100 if it is provided with a valve body 2 adapted to adjust the flow rate of a circulating liquid, as for example a thermostatic head. By conjointly assessing the first pressure P1 upwards of the whole device 100 and the third pressure P3 downwards of the whole device 100 is possible to answer promptly by adapting the reduction factor of the first pressure P1 so as to bring entering at valve body 2 a pressure adequate to the generation of the third pressure P3 in the outlet duct Cout. As previously mentioned, known methods, by analysing only the pressure or the pressure differential in a portion of the cartridge-valve body system, do not ensure a so prompt and accurate answer in the adjustment of the circulating pressure or pressures.

Still another advantage of the present invention is to make available a mounting method of a device for treating a fluid with a particularly easy actuation and that allows to provide an efficient and robust device. The above-mentioned constructive simplicity of components of the cartridge 1 is reflected also in terms of mounting of the cartridge itself. In fact, the cartridge 1 is mainly composed of two elements, i.e. the main body 10 and the shutter 14, that once realized have a particularly simplified association method. It is sufficient to introduce the shutter 14 inside the internal cavity C2 and eventually to install, in an equally simplified manner, some additional components, such as the return element 18 and the abutment element 19. It should be noted that in some embodiments, the shutter 14 has a symmetric structure that makes even more immediate the insertion of the shutter itself in the internal chamber C2, without this involving a particular insertion direction.

The invention claimed is:

1. A Device (100) for treating a fluid comprising:
a cartridge (1) for dynamic reduction of a pressure of said fluid;
a valve body (2) in fluid communication with the cartridge (1);
wherein said cartridge (1) comprises:
a main body (10) provided with:
a first interface (11), configured for receiving said fluid at a first inlet pressure (P1);
a second interface (12), configured for sending to said valve body (2) said fluid at a second intermediate pressure (P2);
a third interface (13), configured for receiving said fluid at a third outlet pressure (P3) from said valve body (2);
a passage (C1) adapted to place in fluid communication said first interface (11) and said second interface (12) and to allow the flow of said fluid from said first interface (11) to said second interface (12), said passage (C1) being extended in said main body (10) along a first direction (X1); and
an internal chamber (C2) traversed by said passage (C1) and in fluid communication with said third interface (13), said internal chamber (C2) being extended in said main body (10) along a second direction (X2) that is not parallel to said first direction (X1);
a shutter (14) movably housed in said internal chamber (C2) and separating said third interface (13) from said passage (C1), said shutter (14) being active on said passage (C1) in order to obstruct it at least partially in a selective and variable manner and to apply a reduction factor between said first pressure (P1) and second pressure (P2), said shutter being movable along said second direction (X2) at least between:
a minimum interference position (Imin) with the passage (C1), wherein the obstruction of said passage is minimal and the reduction factor takes on minimum value;
a maximum interference position (Imax), wherein the obstruction of said passage is maximum and said reduction factor takes on maximum value;
at least one intermediate position (Imed) between said minimum interference position (Imin) and said maximum interference position (Imax) wherein said reduction value takes on an intermediate value between said minimum value and maximum value; and
wherein the position of said shutter (14) is determined by said first inlet pressure (P1) and said third outlet pressure (P3);
wherein said valve body (2) is in fluid communication with the second interface (12) of the cartridge (1) in order to receive said fluid at the second pressure (P2), said valve body (2) being configured at least for bringing said fluid at the third pressure (P3), said valve body (2) comprising:
an inlet opening (21) in fluid communication with said second interface (12) to receive said fluid at the second pressure (P2);
an outlet opening (22) for the outflow of fluid at said third pressure (P3) from said valve body (2); and
wherein said device (100) is configured for placing said outlet opening (22) in fluid communication with said third interface (13) in order to send the fluid at the third pressure (P3) to said cartridge (1).

2. The device (100) according to claim 1, wherein said first direction (X1) and said second direction (X2) together form an angle comprised between 30° and 150°, or comprised between 60° and 120°, or wherein said first direction (X1) and said second direction (X2) are orthogonal to each other; or wherein said shutter (14) is seamlessly movable between said minimum interference position (Imin) and said maximum interference position (Imax) or wherein said shutter (14) is extended along a main extension axis (Y).

3. The device (100) according to claim 2, wherein said shutter (14) comprises:
a support portion (15) configured for movably housing, along said second direction (X2), said shutter (14) in said internal chamber (C2);
an interference portion (16) active on said passage (C1) in order to at least partially obstruct in a selective and variable manner;
wherein said support portion (15) and said interference portion (16) are positioned at opposite ends of the shutter (14) along said main extension axis (Y); or wherein said support portion (15) and said interference portion are integral with each other; or wherein said support portion (15) is sealed with said internal chamber (C2).

4. The device (100) according to claim 3, wherein said support portion (15) comprises a dividing wall (17), said dividing wall (17) dividing said internal chamber (C2) into a first sub-chamber (SC1) and a second sub-chamber (SC2); and wherein said first sub-chamber (SC1) contains said interference portion (16) and at least partially said passage (C1); and wherein said second sub-chamber (SC2) is in fluid communication with said third interface (13).

5. The device (100) according to claim 3, wherein said interference portion (16) comprises an obstructing sector (161) and a transition sector (162), said obstructing sector (161) being configured for operating a greater interference with said passage (C1) with respect to said transition sector (162); and wherein said transition sector (162) is a proximal sector with respect to the support portion (15) along said main extension axis (Y) and said obstructing sector (161) is a distal sector with respect to the support portion (15) along said main extension axis (Y).

6. The device (100) according to claim 1, wherein said passage (C1) comprises:

a first section (C11) extended between said first interface (11) and said internal chamber (C2), said first section (C11) comprising a first opening (A1) facing said internal chamber (C2);

a second section (C12) extended in said internal chamber (C2) and defined by said internal chamber (C2) and said shutter (14), said second section (C12) being in fluid communication with said first section (C11) at said first opening (A1);

a third section (C13) extended between said internal chamber (C2) and said second interface (12), said third section (C13) comprising a second opening (A2) facing said internal chamber (C2), said third section (C13) also being in fluid communication with said second section (C12) at said second opening (A2);

and wherein said second section (C12) is defined by said internal chamber (C2) and said shutter (14);

and wherein said second section (C12) varies as a function of the position taken on by said shutter (14);

and wherein said shutter (14) is configured for at least partially obstructing said first opening (A1) and said second opening (A2) at least when it is situated in said maximum interference position (Imax) and said at least one intermediate position (Imed).

7. The device (100) according to claim 5, wherein said passage (C1) comprises:

a first section (C11) extended between said first interface (11) and said internal chamber (C2), said first section (C11) comprising a first opening (A1) facing said internal chamber (C2);

a second section (C12) extended in said internal chamber (C2) and defined by said internal chamber (C2) and said shutter (14), said second section (C12) being in fluid communication with said first section (C11) at said first opening (A1);

a third section (C13) extended between said internal chamber (C2) and said second interface (12), said third section (C13) comprising a second opening (A2) facing said internal chamber (C2), said third section (C13) also being in fluid communication with said second section (C12) at said second opening (A2);

wherein said obstructing sector (161) is configured for at least partially obstructing said first opening (A1) and said second opening (A2) when, depending on the position taken on by the shutter (14), it is situated such that it affects them; or wherein, when said shutter (14) is in said maximum interference position (Imax), said obstructing sector (161) obstructs said first opening (A1) and said second opening (A2) in a complete manner; and wherein, when said shutter (14) is in said minimum interference position (Imin), said obstructing sector (161) does not affect said first opening (A1) and said second opening (A2); and wherein, when said shutter (14) is in said at least one intermediate position (Imed), said obstructing sector (161) obstructs said first opening (A1) and said second opening (A2) in a partial manner;

and wherein said second section (C12) is defined by said internal chamber (C2) and said shutter (14);

and wherein said second section (C12) varies as a function of the position taken on by said shutter (14);

and wherein said shutter (14) is configured for at least partially obstructing said first opening (A1) and said second opening (A2) at least when it is situated in said maximum interference position (Imax) and said at least one intermediate position (Imed).

8. The device (100) according to claim 1, wherein said cartridge (1) comprises:

a return element (18), operatively associated with said shutter (14); said return element (18) being configured for hindering the movement of said shutter (14) towards the maximum interference position (Imax); and wherein said return element (18) is configured for maintaining said shutter (14) in the minimum interference position (Imin) in the absence of fluid flow or when the first pressure (P1) is lower than a specific threshold; and wherein, when said shutter (14) is in the minimum interference position (Imin), said return element (18) is in a rest condition or a preloading condition and, when said shutter (14) is in the maximum interference position (Imax), the return element is in a compression or extension condition.

9. The device (100) according to claim 1, wherein said valve body (2) comprises means for controlling the flow (23), interposed between said inlet opening (21) and said outlet opening (22), said means for controlling the flow (23) being configurable, in a selective manner, in order to adjust the flow of the fluid exiting from said outlet opening (22); and wherein said means for controlling the flow (23) comprise a ring (231) comprising a plurality of openings (232) having different section for controlling the flow; said plurality of openings (232) being configured for being selectively positioned at said outlet opening (22); and wherein said device (100) comprises adjustment means (24) of said means for controlling the flow (23) configured for moving said ring (231) and selectively positioning an opening of said plurality of openings (232) at said outlet opening (22).

10. The device (100) according to claim 1 comprising an outlet duct (Cout) in fluid communication with said outlet opening (22) of the valve body (2) to receive said fluid at the third pressure (P3); said outlet duct (Cout) also being in fluid communication with said third interface (13) to send to said cartridge (1) the fluid at the third pressure (P3); and wherein said third interface (13) of the cartridge (1) is in fluid communication with said outlet duct in one of the following modes:

said third interface (13) directly faces said outlet duct (Cout) in order to receive the fluid at the third pressure (P3);

said device (100) comprises a control duct connected to said outlet duct (Cout) and to said third interface (13) in order to send, to said third interface, the fluid at the third pressure (P3).

11. The device (100) according to claim 1, wherein said cartridge (1) and said valve body (2) are in fluid communication with each other in one of the following modes:

said cartridge (1) and said valve body (2) are directly connected at the second interface (12) and at the inlet opening (21);

said device (100) comprises an intermediate duct connected to said second interface (12) and to said inlet opening (21) in order to place in fluid communication said cartridge (1) and said valve body (2) and to allow the flow of the fluid at the second pressure (P2).

12. A method (M) for mounting a device (100) for treating a fluid, said device (100) comprising:

a cartridge (1) for dynamic reduction of a pressure of said fluid;

a valve body (2) in fluid communication with the cartridge (1);

the method comprising at least the following steps:

arranging (M1) a main body (10) of the cartridge (1), the main body comprising:

a first interface (11);

a second interface (12);

a third interface (13);

a passage (C1) extended in a first direction (X1) in order to place in fluid communication said first interface (11) and said second interface (12); and an internal chamber (C2) traversed by said passage (C1) and in fluid communication with said third interface (13), said internal chamber (C2) extended along a second direction (X2) that is not parallel to said first direction (X1);

arranging (M2) a shutter (14) of the cartridge (1);

mounting (M3) the cartridge (1), movably housing said shutter (14) in said internal chamber (C2) in order to at least partially interfere with said passage (C1) and to separate said passage (C1) from said third interface (13), said shutter (14) being movable along said second direction (X2) in order to modify a degree of interference with said passage (C1); and associating (M4) the valve body (2) to said second interface (12) in order to transmit fluid at the second pressure (P2) from said cartridge (1) to said valve body (2);

associating (M5) an inlet duct (Cin) with said first interface (11) in order to send said fluid at a first pressure (P1) to said cartridge (1);

associating (M6) said valve body (2) with an outlet duct (Cout) in order to send to said outlet duct (Cout) said fluid at a third pressure (P3);

associating (M7) said outlet duct (Cout) to said third interface (13) of the main body (10) in order to send to said cartridge (1) said fluid at the third pressure (P3).

13. The method according to claim 12, wherein said step (M3) of mounting a cartridge (1) provides that said first direction (X1) and said second direction (X2) together form an angle comprised between 30° and 150°, or comprised between 60° and 120°, or wherein said first direction (X1) and said second direction (X2) are orthogonal to each other.

14. The method according to claim 12, wherein said step (M4) of associating a valve body (2) to said second interface (12) provides for one of the following solutions:

directly connecting said valve body (2) to the second interface (12);

arranging an intermediate duct interposed between said valve body (2) and said second interface (12) in order to place in fluid communication said valve body (2) and said cartridge (1);

or wherein said step (M7) of associating said outlet duct (Cout) to said third interface (13) of the main body (10) provides for one of the following solutions:

directly connecting said third interface (13) to said outlet duct (Cout);

arranging a control duct interposed between said outlet duct (Cout) and said third interface (13) in order to place in fluid communication said outlet duct (Cout) and said cartridge (1).

15. The method according to claim 12, further comprising one or more of the following steps:

associating (M5) an inlet duct (Cin) with said first interface (11) in order to send said fluid at a first pressure (P1) to said cartridge (1);

associating (M6) said valve body (2) with an outlet duct (Cout) in order to send to said outlet duct (Cout) said fluid at a third pressure (P3);

associating (M7) said outlet duct (Cout) to said third interface (13) of the main body (10) in order to send to said cartridge (1) said fluid at the third pressure (P3);

or wherein said step (M4) of associating a valve body (2) to said second interface (12) provides for one of the following solutions:

directly connecting said valve body (2) to the second interface (12);

arranging an intermediate duct interposed between said valve body (2) and said second interface (12) in order to place in fluid communication said valve body (2) and said cartridge (1);

or wherein said step (M7) of associating said outlet duct (Cout) to said third interface (13) of the main body (10) provides for one of the following solutions:

directly connecting said third interface (13) to said outlet duct (Cout);

arranging a control duct interposed between said outlet duct (Cout) and said third interface (13) in order to place in fluid communication said outlet duct (Cout) and said cartridge (1).

16. The cartridge (1) according to claim 3, wherein said interference portion (16) comprises an obstructing sector (161) and a transition sector (162), said obstructing sector (161) being configured for operating a greater interference with said passage (C1) with respect to said transition sector (162); and wherein said transition sector (162) has a tapered shape having section increasing along the main extension axis (Y) in a direction approaching said obstructing sector (161).

17. The device (100) according to claim 1 comprising an outlet duct (Cout) in fluid communication with said outlet opening (22) of the valve body (2) to receive said fluid at the third pressure (P3); said outlet duct (Cout) also being in fluid communication with said third interface (13) to send to said cartridge (1) the fluid at the third pressure (P3).

18. The device (100) according to claim 2, wherein said main extension axis (Y) is, during use, parallel to, or coinciding with, said second direction (X2) or wherein said shutter (14) has a symmetric structure with respect to said main extension axis (Y).

19. The device (100) according to claim 4, wherein said dividing wall (17) comprises a first side (171), directed towards said first sub-chamber (SC1) and configured for being affected by said fluid entering at the first pressure (P1), and a second side (172), opposite said first side (171) and directed towards said second sub-chamber (SC2) in order to be affected by said fluid at said third pressure (P3); or wherein said support portion (15) is configured for preventing a fluid communication between said first sub-chamber (SC1) and second sub-chamber (SC2); or wherein said dividing wall (17) is extended in a direction orthogonal to the main extension axis (Y) of the shutter (14); or wherein the maximum interference position (Imax) of the shutter (14) corresponds to a position of maximum proximity of the dividing wall (17) to the third interface (13) and the minimum interference position (Imin) of the shutter (14) corresponds a position of maximum distance of the dividing wall (17) from the third interface (13).

\* \* \* \* \*